(12) United States Patent (10) Patent No.: US 7,896,375 B2
Cynn (45) Date of Patent: Mar. 1, 2011

(54) ARM AND LEG POWERED BICYCLE

(76) Inventor: Kie-Ho Cynn, Honolulu, HI (US)

( * ) Notice: Subject to any disclaimer, the term of this patent is extended or adjusted under 35 U.S.C. 154(b) by 334 days.

(21) Appl. No.: 11/916,991

(22) PCT Filed: Jun. 17, 2005

(86) PCT No.: PCT/KR2005/001865
§ 371 (c)(1),
(2), (4) Date: May 22, 2008

(87) PCT Pub. No.: WO2006/132450
PCT Pub. Date: Dec. 14, 2006

(65) Prior Publication Data
US 2008/0238021 A1   Oct. 2, 2008

(30) Foreign Application Priority Data
Jun. 8, 2005   (KR) .................. 10-2005-0048773

(51) Int. Cl.
*B62M 1/00* (2010.01)

(52) U.S. Cl. ...... 280/234; 280/233; 280/230; 280/242.1; 280/244

(58) Field of Classification Search .................. 280/234, 280/233, 230, 242.1, 244
See application file for complete search history.

(56) References Cited

U.S. PATENT DOCUMENTS

| | | | | |
|---|---|---|---|---|
| 4,685,692 A | * | 8/1987 | Fullilove et al. | 280/234 |
| 4,858,942 A | * | 8/1989 | Rodriguez | 280/233 |
| 5,082,302 A | * | 1/1992 | Nacar | 280/234 |
| 5,308,097 A | * | 5/1994 | Bono et al. | 280/234 |
| 5,328,195 A | * | 7/1994 | Sommer et al. | 280/233 |

(Continued)

FOREIGN PATENT DOCUMENTS

CH   219 564 A   2/1942

(Continued)

OTHER PUBLICATIONS

Supplemental European Search Report mailed Dec. 2, 2009, in corresponding European Patent Application No. 05756744.8.

(Continued)

*Primary Examiner* — Lesley Morris
*Assistant Examiner* — Michael R Stabley
(74) *Attorney, Agent, or Firm* — Christensen O'Connor Johnson Kindness PLLC

(57) ABSTRACT

The present invention relates to an arm and leg powered bicycle, comprising handle levers, a front wheel, a rear wheel, a handle shaft, supporting frames, pedals, a pedal shaft, front and rear sprockets and a chain belt, wherein the bicycle further includes an operating means for vertically rotating the handle levers, said member consisting of a handle rotation shaft, an operating rod or rods and a handle rotation shaft support, and a means for transferring the rotating force of the handle levers to a pedal shaft, said means consisting of a crank shaft, a rotating shaft, a flexible joint, a driving gear and a driven gear mounted on a pedal shaft. In the inventive arm and leg powered bicycle with such a construction, the mutual movement of both the handle levers and the pedals causes the vertical rotation of the handle levers by the work of the arms to cooperate synchronously with the movement of the pedals by the work of the legs, whereby the running speed of the bicycle can be doubled and the arm exercise can be conducted simultaneously.

14 Claims, 23 Drawing Sheets

U.S. PATENT DOCUMENTS 6,264,224 B1 * 7/2001 Phillips .......................... 280/234
6,688,623 B1 * 2/2004 Yunaska ........................ 280/233

FOREIGN PATENT DOCUMENTS

| | | |
|---|---|---|
| DE | 198 29 750 A1 | 2/1999 |
| FR | 596 442 A | 10/1925 |
| FR | 2 669 660 A | 5/1992 |
| FR | 2 717 767 A | 9/1995 |

OTHER PUBLICATIONS

Office Action issued Dec. 22, 2010, in corresponding Japanese Patent Application No. 2008-515612.

* cited by examiner

ARM AND LEG POWERED BICYCLE

TECHNICAL FIELD

The present invention relates to an arm and leg powered bicycle and more particularly to an arm and leg powered bicycle which can have a much higher speed due to the power of the arms in addition to that of the legs and which can also be used for the arm exercise.

BACKGROUND OF ART

Generally, the bicycles have been used conveniently and widely from old times as a transporting means which can run by causing the rear wheel to rotate through pedaling with the help of only legs without consumption of any fuel. Particularly recently the bicycle riding is favored by almost everyone as it is recognized as one of sports beneficial to the health in step with the rising interest in the health, because bicycles are not only free from the environment pollution owing to the exhaust gases but also the pedal movement for pressing the bicycle pedals corresponds to the aerobic exercise needed for the human body.

The ordinary bicycle, however, are somewhat too deficient in the propulsive force to be the long distance transporting means or mountaineer bicycles. Therefore, the speed change gears have been mounted on bicycles to increase the propulsive force and there has been proposed a plan to drive both the front gear and the rear gear simultaneously. However, such bicycles mostly failed to be put to practical use because of the unreliable operation and considerable resistance in the power transmitting processes.

DISCLOSURE OF INVENTION

The present inventor was engaged intensively in developing a bicycle capable of being powered by the arms in conjunction with the legs upon the judgment that the ability to increase the speed of a bicycle and to help the arm exercise at the same time by modifying the fixed handle levers in the ordinary bicycles driven so far only by the feet power so as to be driven by the hands would be a great help to the improvement in the health.

As the result, the present inventor has come to develop a new bicycle with a safe and simple structure, in which bicycle the vertical movement of the handle levers can be applied to the driving force of the rear wheel by embodying the handle levers to be movable, still maintaining the overall balance of the bicycle, and subsequently by causing the resulting movement to be transferred to the pedal shaft so as to cooperate synchronously with the movement of the pedals.

The object of the invention, corresponding to the provision of the bicycle described last, is achieved according to an aspect of the invention by an arm and leg powered bicycle, comprising handle levers, front wheel, rear wheel, handle shaft, supporting frames connecting various parts, pedal shaft for transferring the movement of the pedals to the rear wheel, front and rear sprockets and a chain belt revolving around the sprockets, wherein an operating means for vertically rotating the handle levers and a means for transferring the rotating force of the handle levers to a pedal shaft are further provided and the handle levers and the pedals are moved oppositely to each other to cause the vertical rotation of the handle levers to cooperate synchronously with the movement of the pedals, with the overall balance of the bicycle body maintained.

Preferably, the operating means for vertically rotating the handle levers is composed of a handle rotation shaft provided vertically movably at the central position of the straight line of handle levers, one or two operating rods connected to the left side, right side or both sides of the handle levers, and a handle rotation shaft support, and further the handle levers are provided so as to be rotatable around the handle lever rotating shaft as the rotation center by the operation of an actuating pin, said actuating pin being provided on the top of the handle shaft, and the above-described means for transferring the rotating force of the handle levers to a pedal shaft comprises a crank shaft connected to the operating rod or rods and rotatable by the vertical movement of the operating rod or rods, a rotating shaft inserted in the inner cavity of a lower supporting frame connected to a handle shaft supporting member, said rotating shaft acting to transfer the driving force of the handle levers to the pedal shaft, a flexible joint provided at one end of the rotating shaft, a driving gear provided at the other end of the rotating shaft, and a driven gear mounted on the circumference of the pedal shaft and engaged with the driving gear to transfer the rotation force to the pedal shaft.

According to another aspect of the invention, one end of the crank shaft is connected to the flexible joint provided in the rotation shaft through a cut-out groove provided in the handle shaft supporting member and the other end of the crank shaft is connected to the handle rotation shaft support so as to allow for the crank shaft to rotate in conjunction with the operating rod or rods in accordance with the movement of the handle levers. Preferably, the crank shaft is shaped with bends in the form of U or ⊐ depending on the number of the rods for the smooth operation and also the crank shaft may be formed optionally in a straight line, wherein a crank shaft gear and a rotating shaft gear are mounted integrally therewith to transfer the torque produced at the handle levers ultimately to the pedal shaft.

BEST MODE FOR CARRYING OUT THE INVENTION

The present invention is described in detail below by referring to the accompanying drawings.

FIGS. 1 to 13 show the overall structure of the representative first embodiment of arm and leg powered bicycle according to the invention and FIGS. 14 to 18, as a variant of the embodiment shown in FIGS. 1 to 13, show the operative relation for the case where the operation rods as the operation means for vertical turning of the handle levers of the invention are mounted in number of two. Further, FIGS. 19 to 23 show the third embodiment of the invention illustrating a still other example of the crank shaft as the transmitting means for the torque of the handle levers in the invention.

Figure 1:
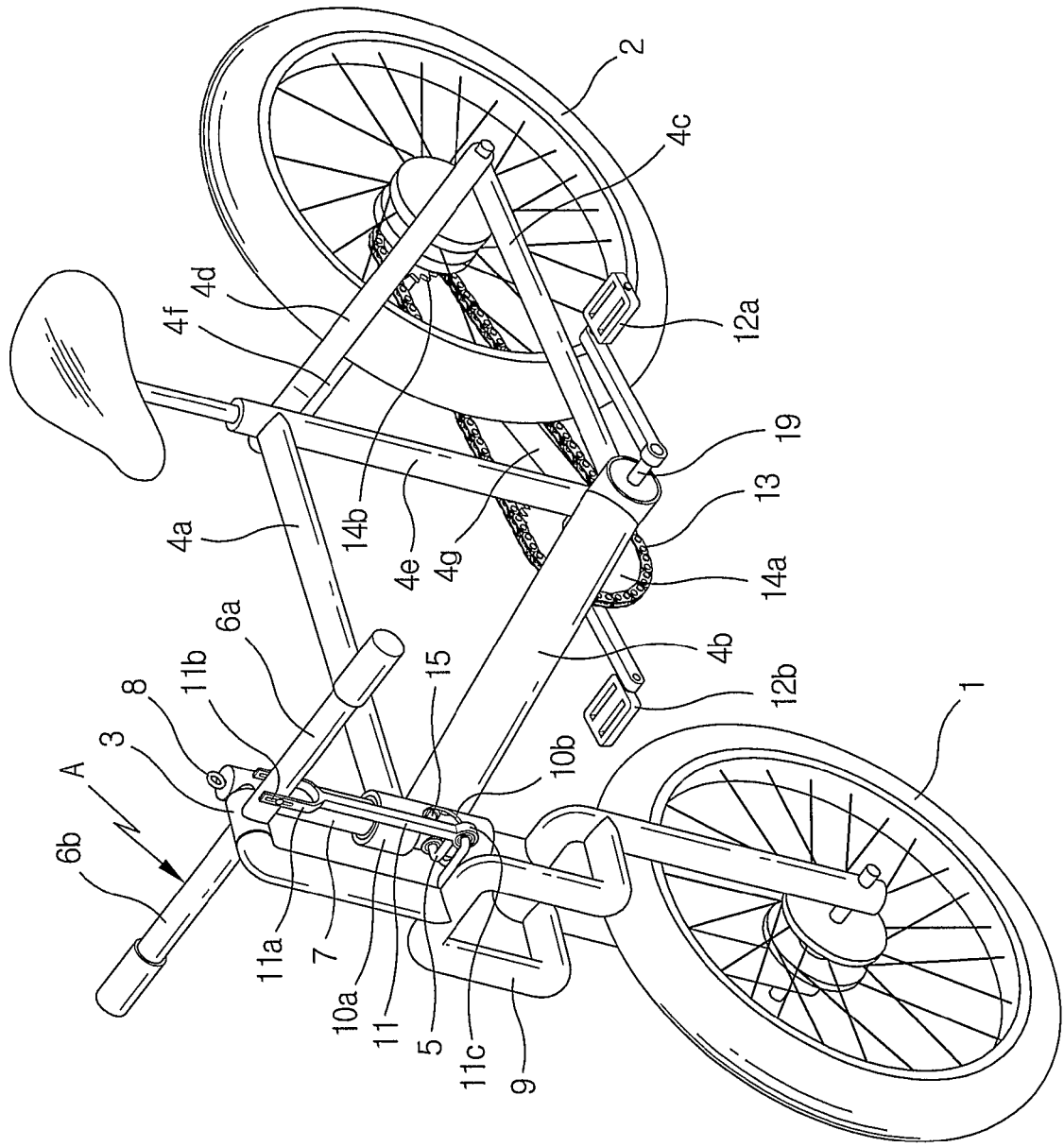
FIG. 1 shows the perspective view of an arm and leg powered bicycle according to the representative embodiment of the invention, illustrating the overall structure.
Figure 2:
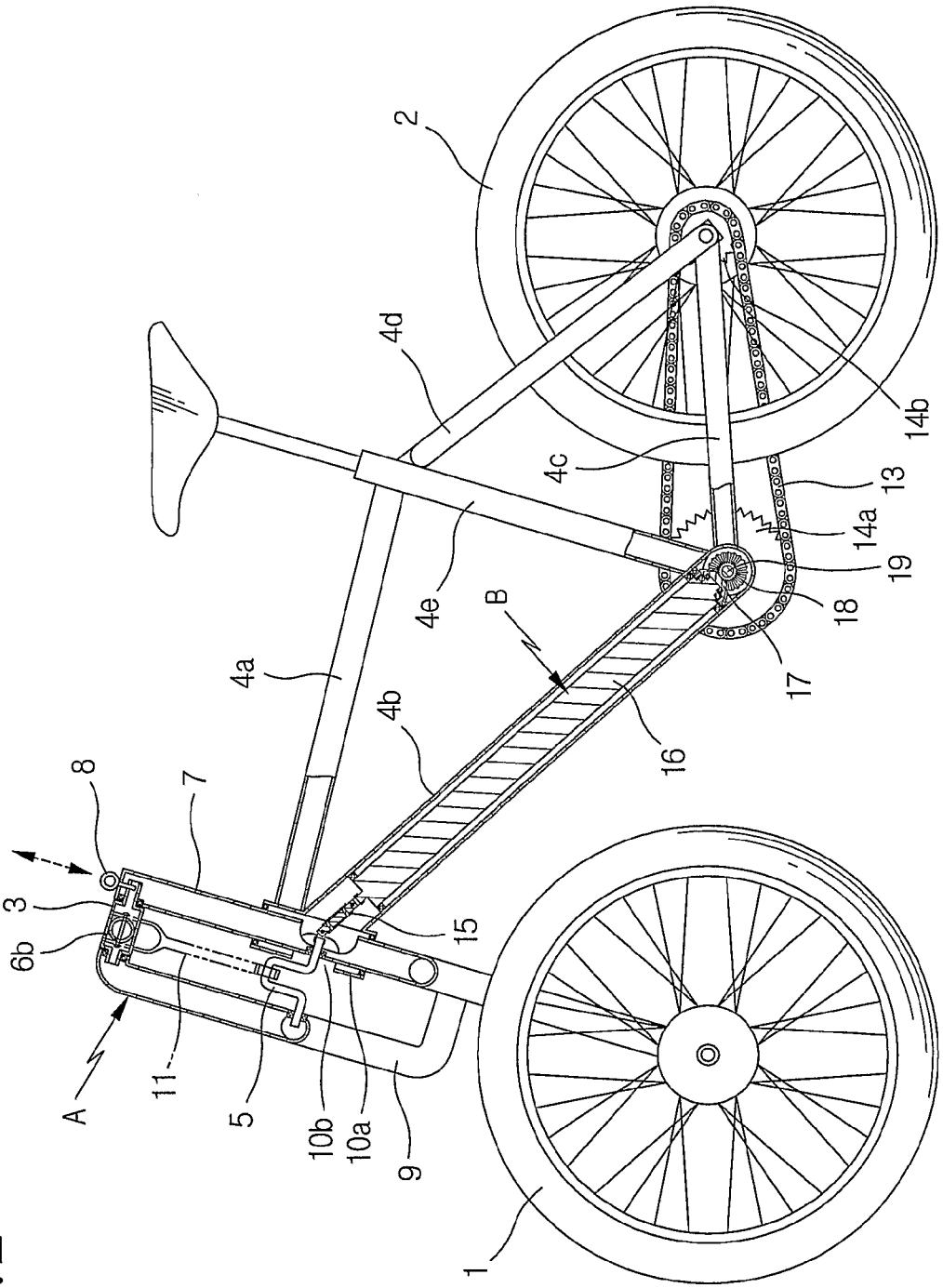
FIG. 2 shows the cross sectional view of an arm and leg powered bicycle according to the invention.
Figure 3:
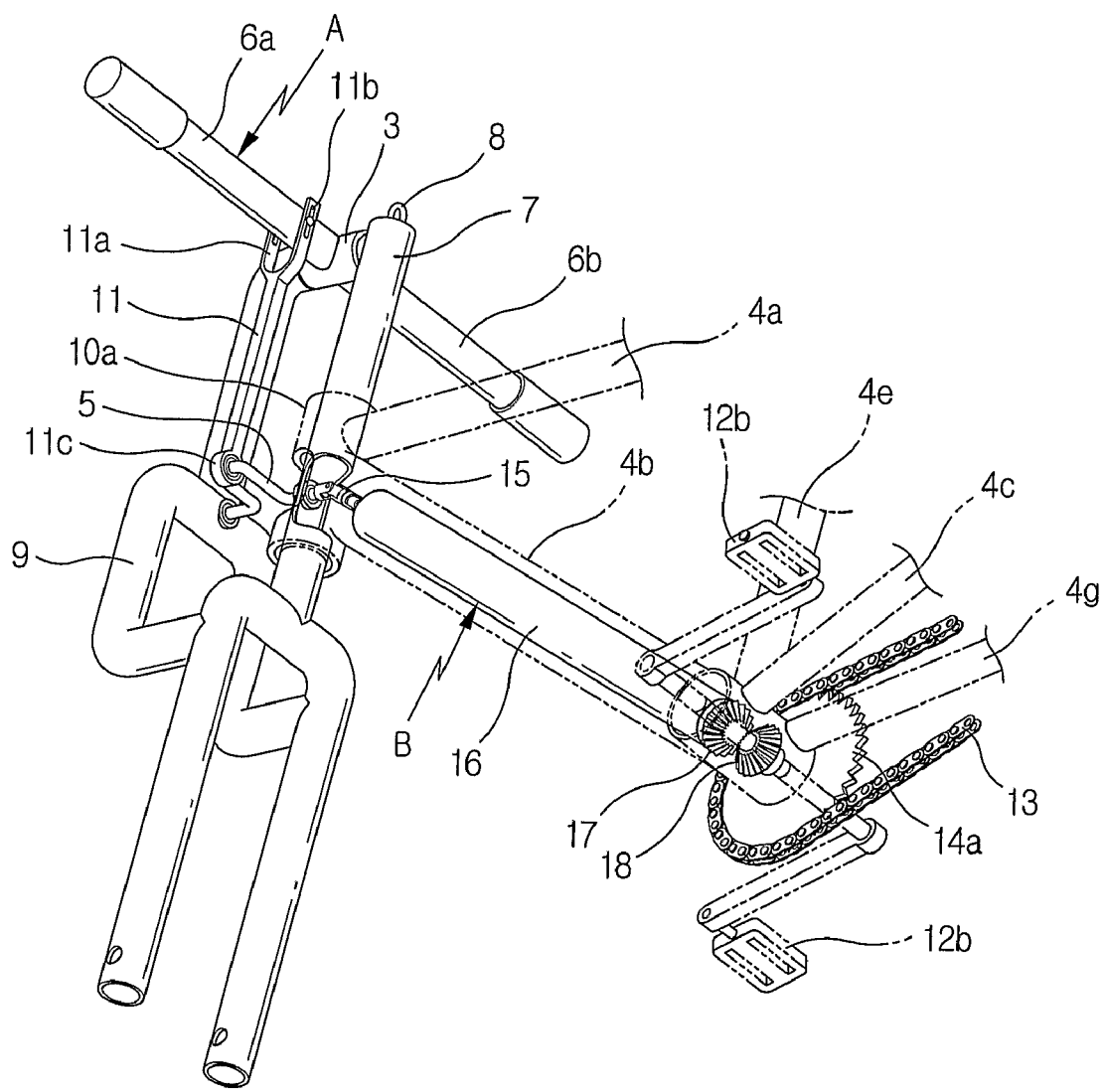
FIG. 3 shows the partial perspective view of an arm and leg powered bicycle according to the invention, illustrating the procedure of transferring the arm force to the pedal shaft connected to the rear wheel.
Figure 4:
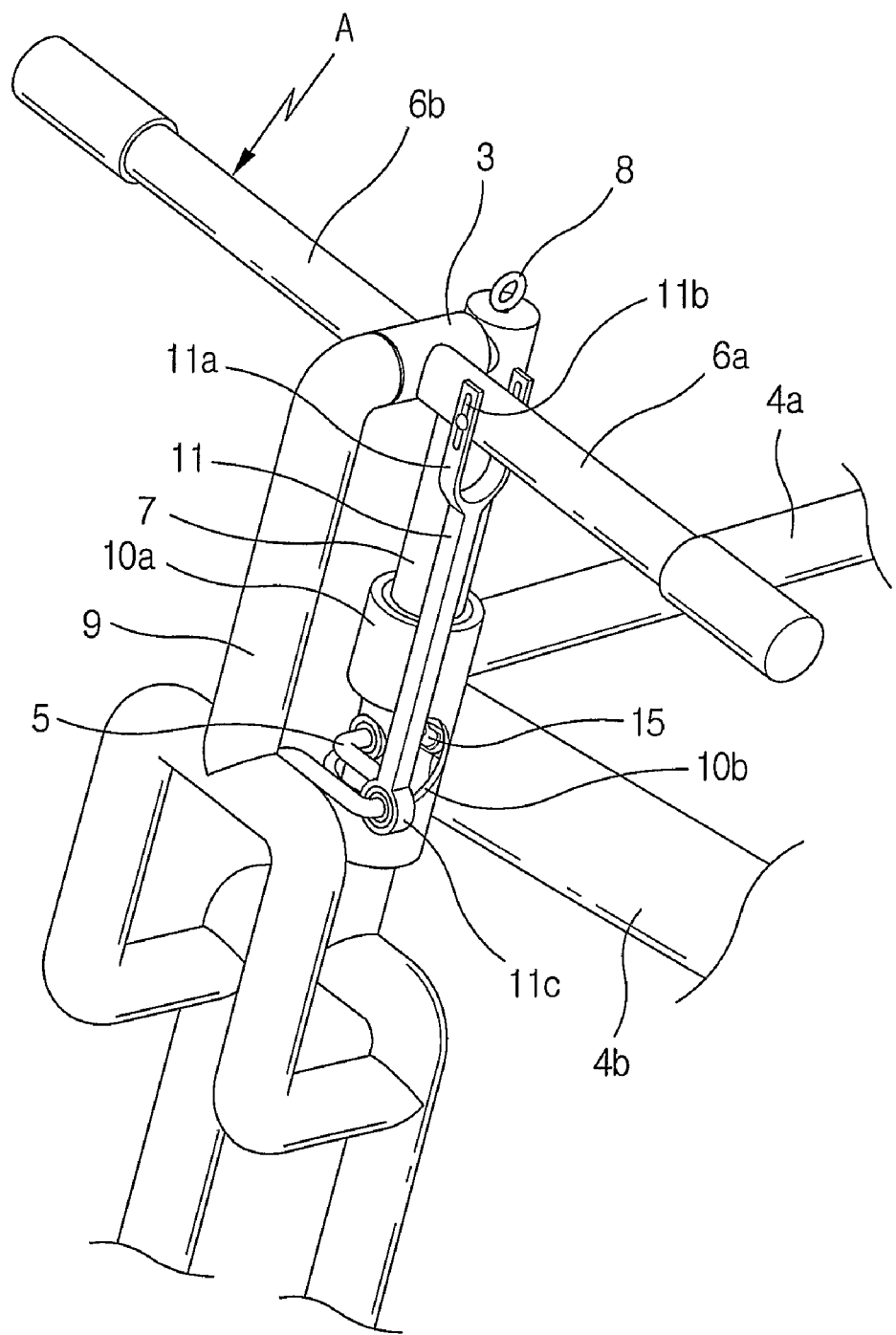
FIG. 4 shows the perspective front view of an arm and leg powered bicycle according to the invention, illustrating the structure of the operating means for rotating the handle levers.

As described in detail in FIGS. 1 and 2, the arm and leg powered bicycle according to the invention comprises handle levers 6a and 6b, front and rear wheel 1 and 2, and pedals 12a and 12b, as in the ordinary bicycles, and further comprises a handle shaft 7 connected to the handle levers 6a and 6b and connected also to the front wheel 1 via handle shaft supporting member 10a, and a pedal shaft 19 for transferring the motion of the pedals 12a and 12b to the rear wheel 2 together with front and rear sprockets 14a and 14b and a chain belt 13 circulating around the sprockets. Additionally, there are included a saddle (not numbered) and several supporting frames 4a, 4b, 4c, 4d, 4e, 4f and 4g to connect and support the above described members.

In addition, the arm and leg powered bicycle according to the invention includes further the operative means A for the purpose of moving the handle members 6a and 6b up and down, which means consists of a handle rotation shaft 3, an operating rod 11 and a handle rotation shaft support 9, and the means B for transmitting the rotating force of the handle levers 6a and 6b to the pedal shaft 19, which means consists of a crank shaft 5, a rotation shaft 16, a flexible joint 15, a driving gear 17 and a driven gear 18 combined to the pedal shaft 19.

Figure 5:
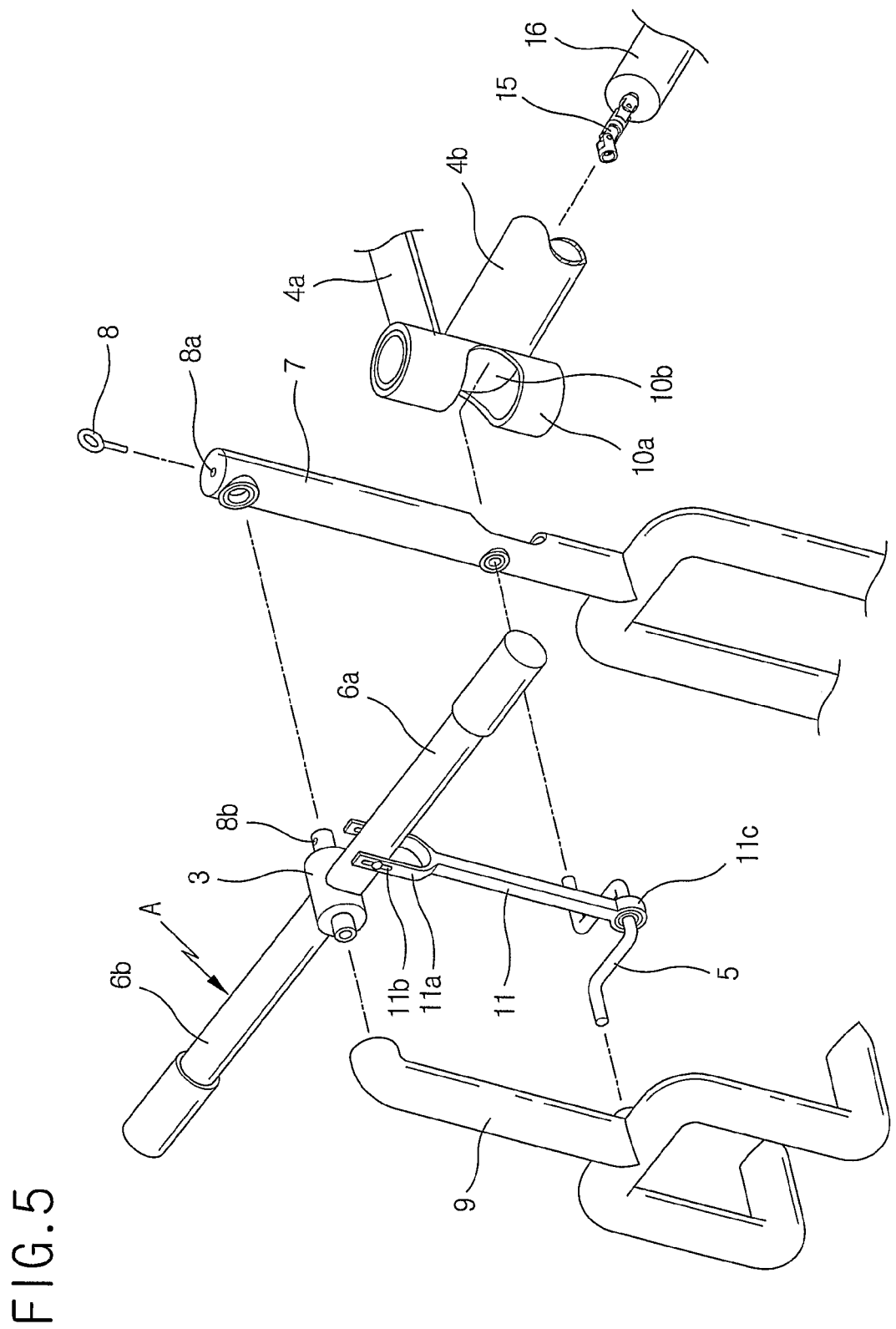
FIG. 5 shows the exploded perspective view of the arm and leg powered bicycle according to the invention, as shown in FIG. 4.
Figure 6:
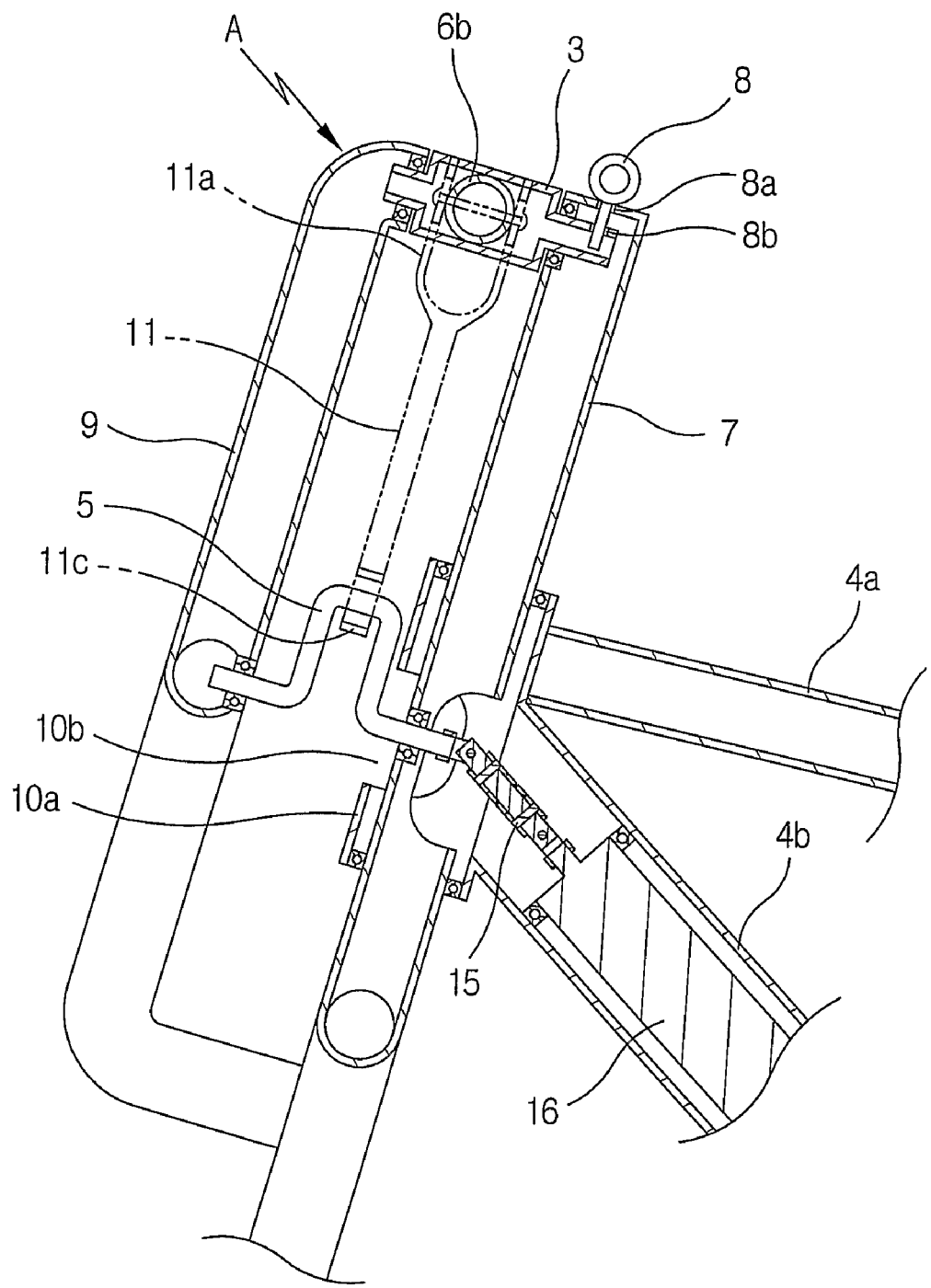
FIG. 6 shows the enlarged cross sectional the front part as shown in FIG. 2.

The handle rotation shaft 3, which is located at the center of the handle levers 6a and 6b to act as a fulcrum of the levers, is disposed so that the opposite ends of the shaft 3 may be freely movable in the vertical direction on the tops of the handle shaft 7 and the handle rotation shaft support 9 (Refer to FIG. 5). Further, the top of the handle shaft 7 is provided with an actuating pin 8, so that it can come into or out of the engagement with a hole 8b positioned in the rear of the handle rotation shaft 3 through a through-hole 8a positioned at that top, as shown in FIGS. 2, 5 and 6, wherein the actuating pin is used to allow the rotation or immobility of the handle rotation shaft 3. The handle rotation shaft 3 which is pivotally mounted through bearings acts to allow the vertical movement of the handle levers 6a and 6b in accordance with the movement of the driver's hands.

The operating rod 11, which is positioned inwardly of the handle shaft 7, the handle rotation shaft 3 and the handle rotation shaft support 9 contiguous thereto, is fixed to the left or right side of the handle levers 6a and 6b, as shown in FIGS. 1 to 6, while the top part 11a maintains the free tilting of the handle levers 6a and 6b through a pin hole 11b. Further, the lower part 11c of the operating rod 11 is appropriately connected to the crank shaft 5 as a means to transmitting the rotating force of the handle levers 6a and 6b to the pedal shaft 19.

The crank shaft 5 is connected to the operating rod 11 so as to be movable up and down. As can be seen from FIG. 2, one end of the crank shaft 5 is connected to the flexible joint 15 provided in the rotation shaft 16 functioning to transmit the rotating force of the handle levers 6a and 6b to the pedal shaft 19 through a cut-out groove 10b provided in the lower part of the handle shaft 7, wherein the flexible joint 15 is positioned in the hollow cavity of a lower supporting frame 4b which in turn is connected to the handle shaft supporting member 10a of a bicycle. Further, the other end of the crank shaft 5 is connected to the handle rotation shaft support 9 so as to allow for the crank shaft 5 to turn freely. The crank shaft 5 is shaped approximately in the form of U, wherein the projected part of the U form is connected to the bottom 11c of the operating rod 11.

The above-described rotation shaft 16 is mounted in the inner cavity of the lower supporting frame 4b, which is provided as a skeleton structure between the handle shaft supporting member 10a of the handle shaft 7 and the pedal shaft 19, as in ordinary bicycles, wherein one end of the rotation shaft 16 is connected to the flexible joint 15 moving smoothly corresponding to the movement of the crank shaft 5 and the opposite end thereof is provided with the driving gear 17.

Figure 12:
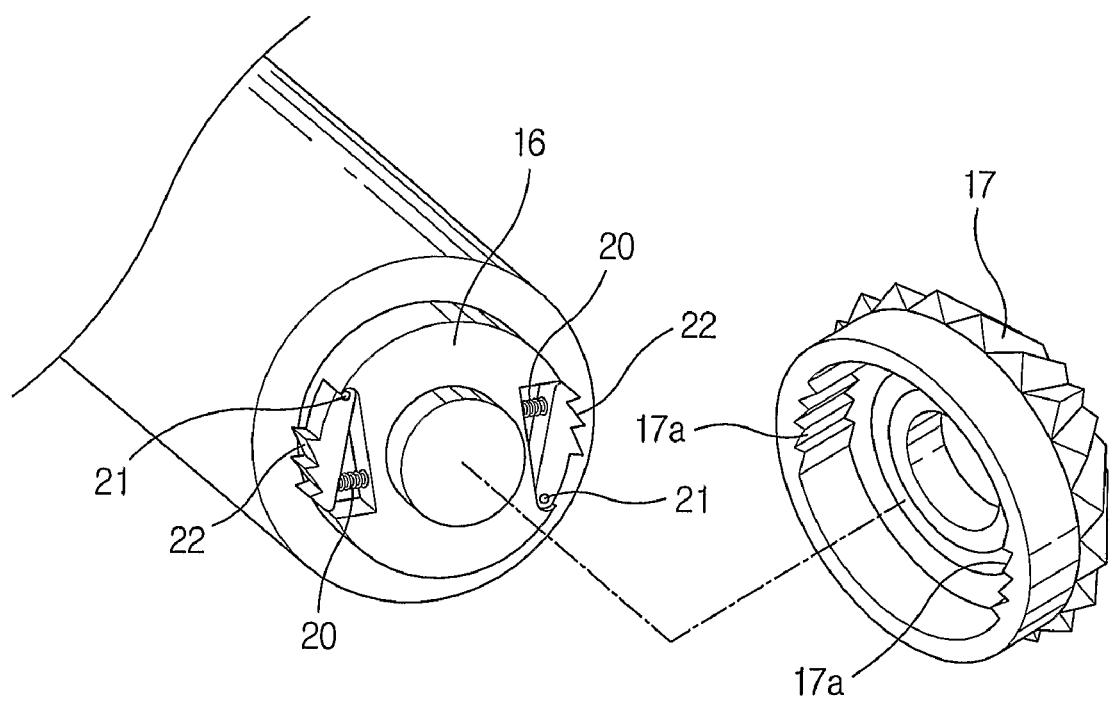
FIG. 12 shows the exploded perspective view, illustrating the connection of the rotating shaft for transferring the torque of the handle levers to the pedal shaft with the driving gear, in the inventive arm and leg powered bicycle.

Particularly as shown in the enlarged view of FIG. 12, the driving gear 17 is formed, on its inner circumference, with two toothed parts 17a at diagonally opposite positions, that is, 180° spaced from each other. Correspondingly, the bottom end of the rotating shaft 16 is mounted with two rocking members 21 each having a toothed part 22, wherein the rocking members 21 can elastically be expanded to or shrunk from the driving gear 17 on the base of the supporting point 21a by the springs 20 so as to engage with or disengage from the gear 17.

A chain belt 13 is mounted around the two sprockets 14a and 14b as in usual cases. In the arm and leg powered bicycle according to the invention, a driven gear 18 is combined to the pedal shaft 19 for rotating the sprockets 14a and 14b, wherein the driven gear 18 is so arranged as to be rotated by the driving gear 17, as depicted in FIG. 2 and FIGS. 9 to 11.

Figure 7:
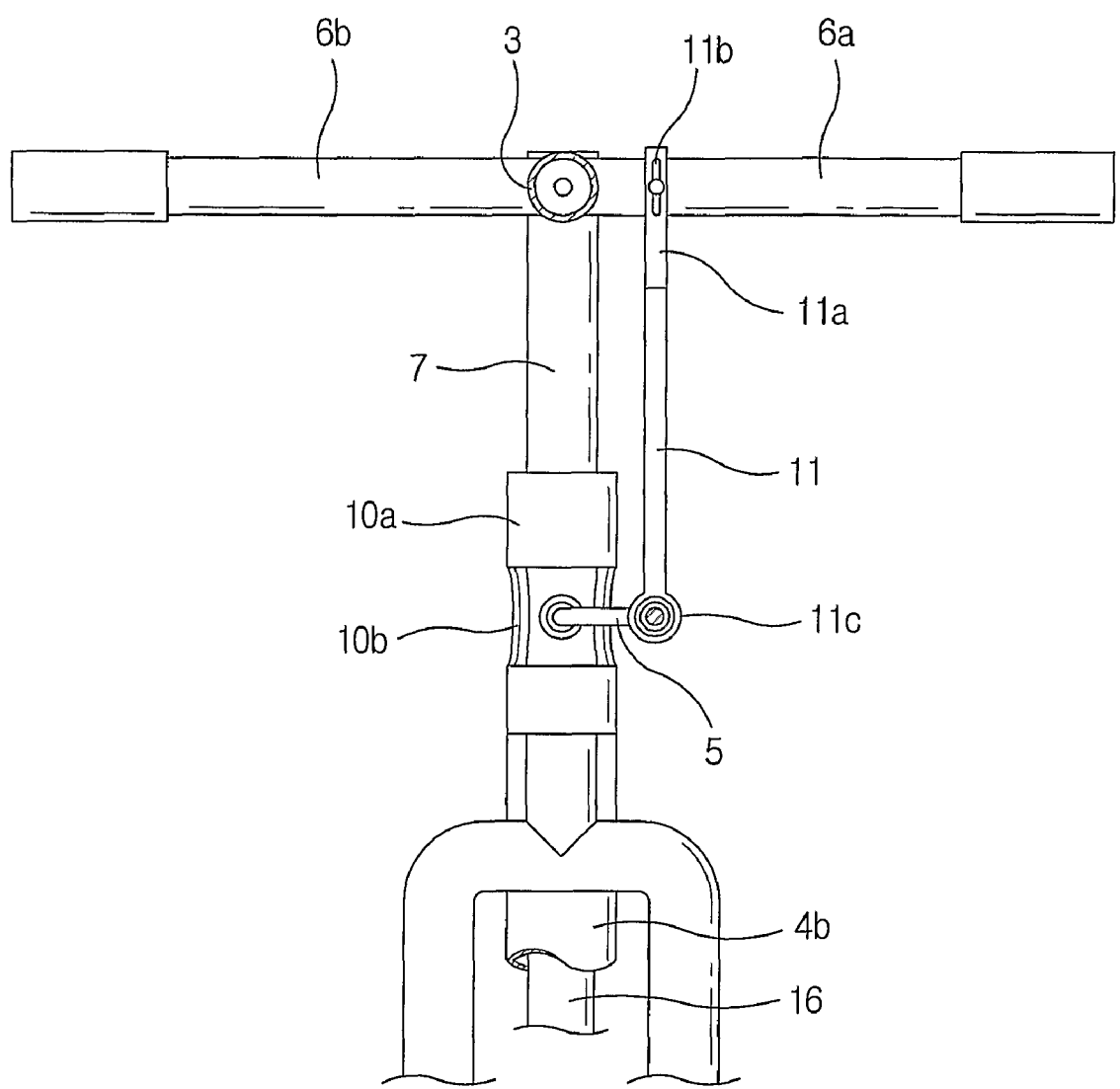
FIG. 7 shows the front view of the arm and leg powered bicycle according to the invention, as shown in FIG. 1, showing the horizontal features, with the handle levers remaining in the inactive state.
Figure 8:
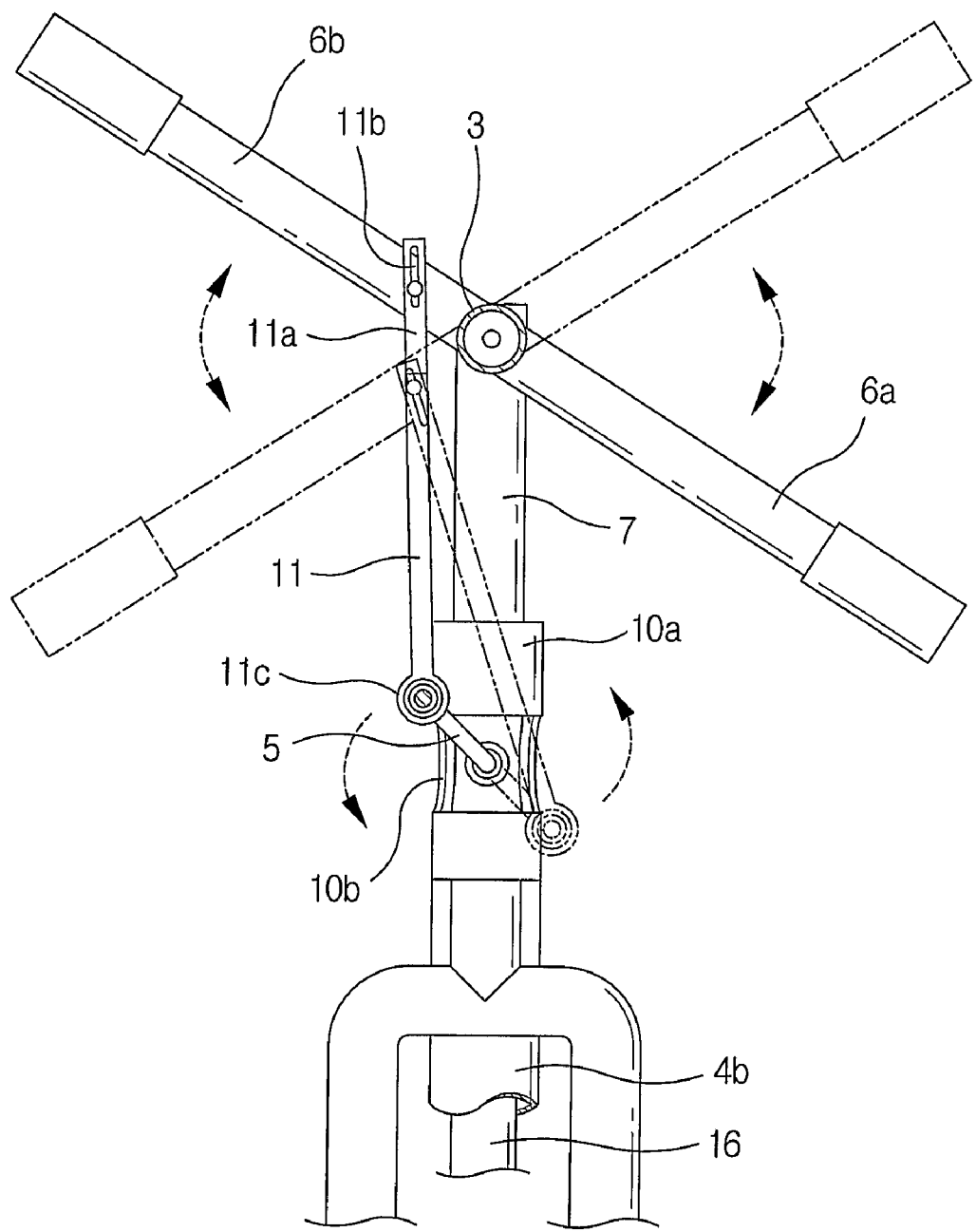
FIG. 8 shows the front view of the arm and leg powered bicycle according to the invention, as shown in FIG. 7, illustrating the operative relation between the operating rod and the crank shaft when the handle levers move up and down in the operating state.
Figure 9:
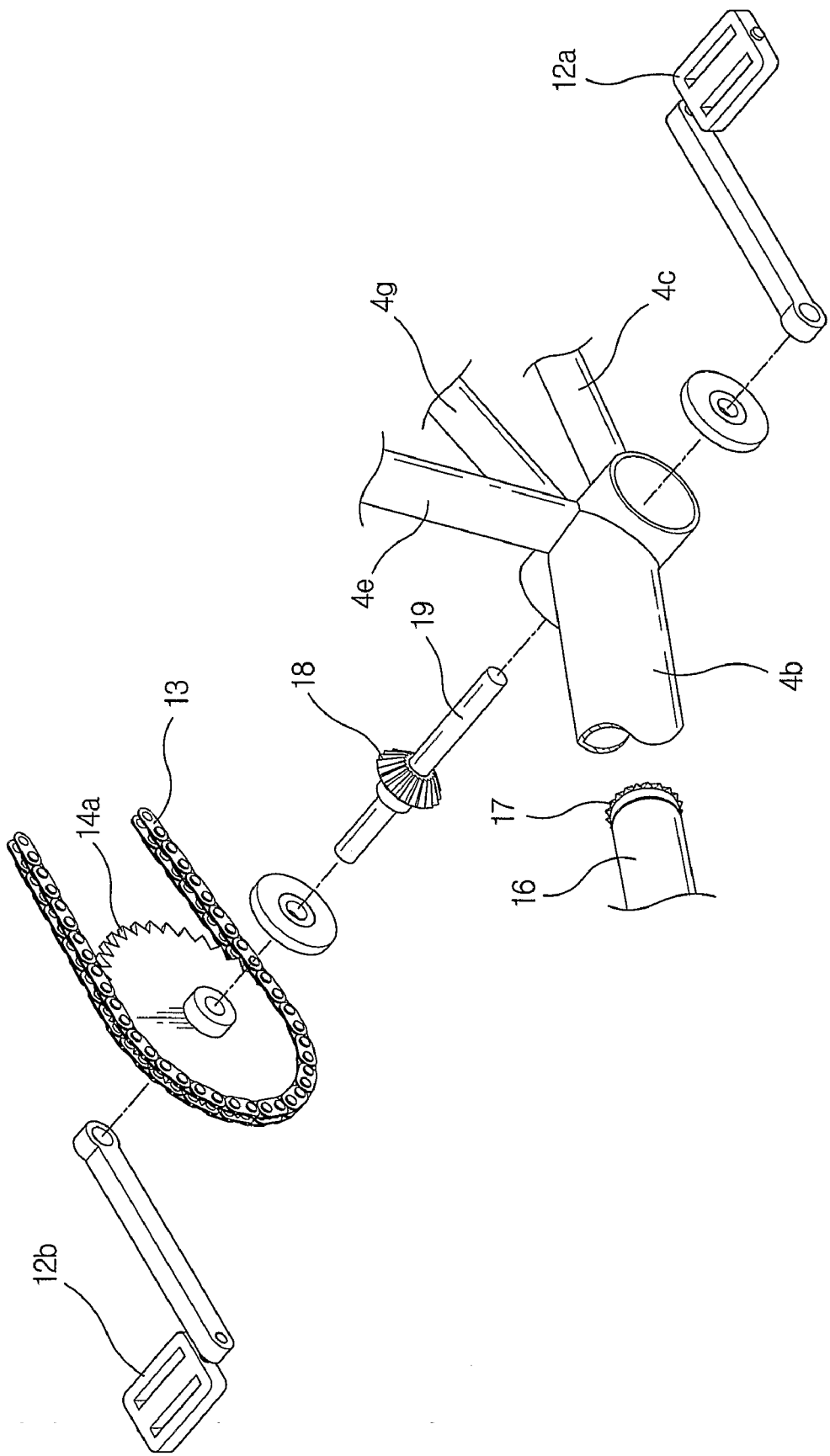
FIG. 9 shows the exploded perspective view of an arm and leg powered bicycle according to the invention, illustrating the interlocking relation between the rotating shaft connected to the crank shaft, as a means for transferring the torque of the handle levers to the pedal shaft, and the pedal shaft.
Figure 10:
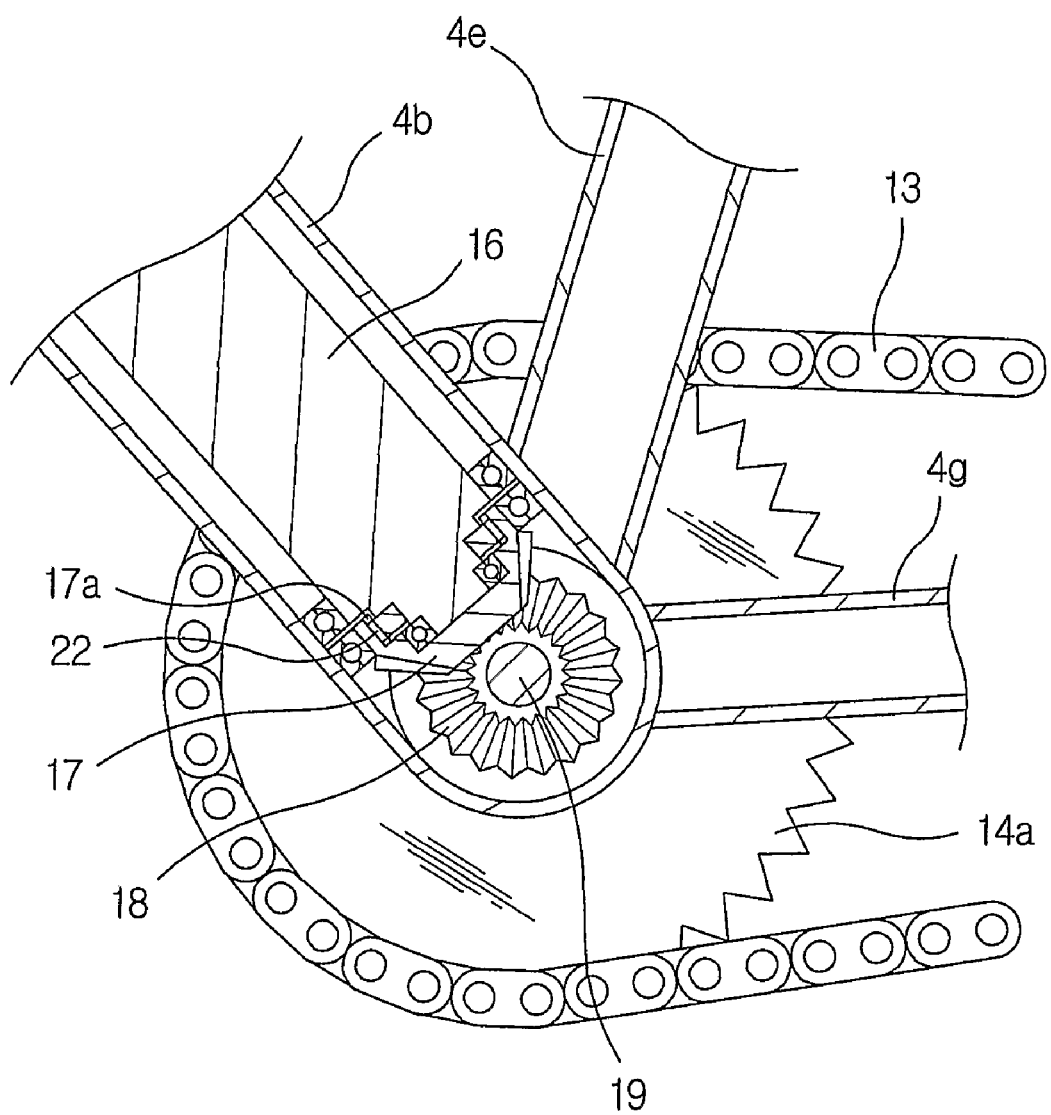
FIG. 10 shows the cross sectional view of a part of the inventive bicycle, illustrating the relation among the components as shown in FIG. 9.
Figure 11:
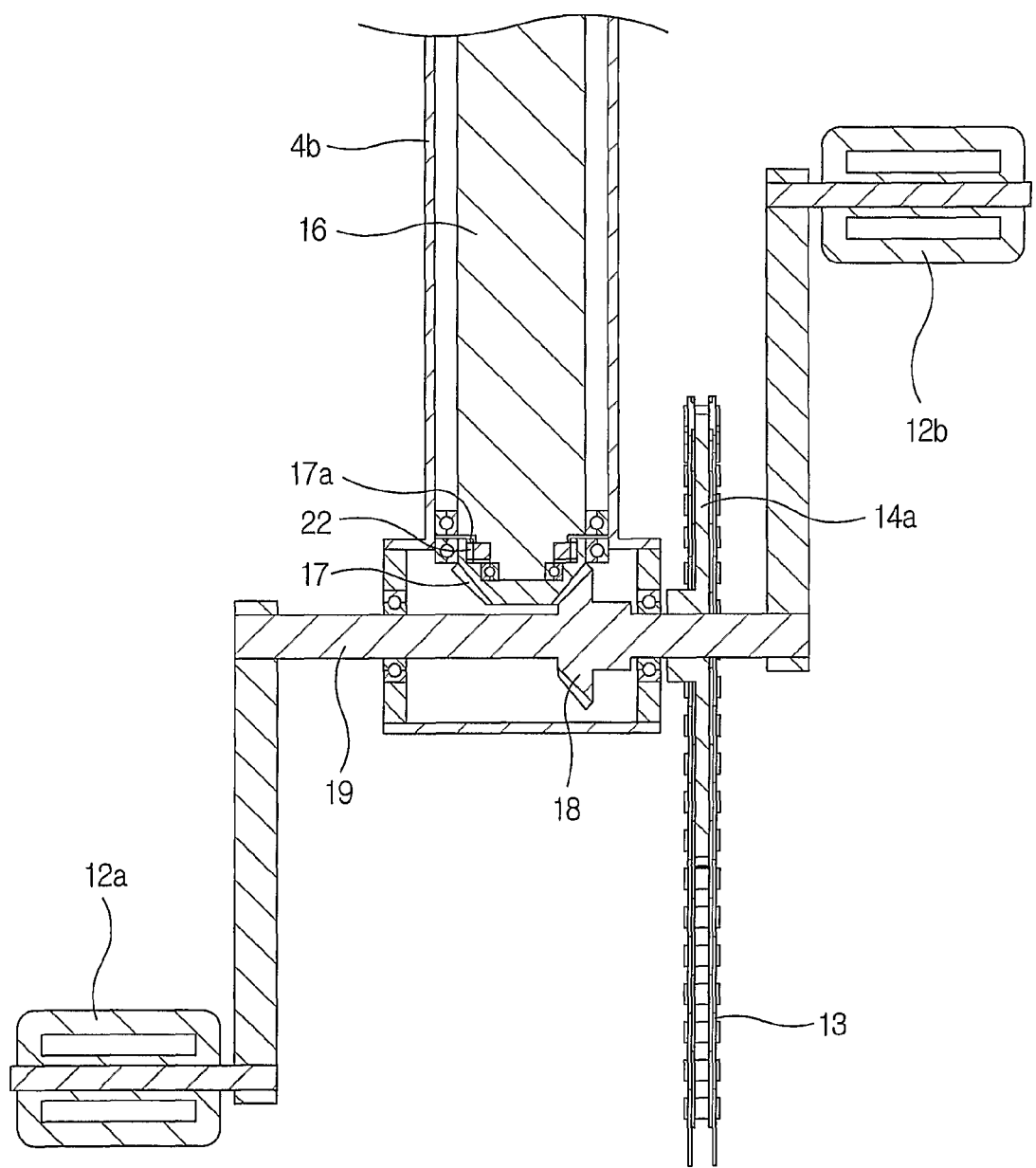
FIG. 11 shows the cross sectional view of a part of an arm and leg powered bicycle according to the invention, illustrating the connective relation between the both pedals and the respective components when the arms and legs work simultaneously.

In order to speed up an arm and leg powered bicycle according to the invention, as constructed as described in the above, the actuating pin 8 provided on the top of the handle shaft 7 for the handle levers 6a and 6b is pulled upward, as seen in FIG. 2, to permit the handle levers 6a and 6b, which have been unmovable together with the handle rotation shaft 3 due to the actuating pin 8, to turn alternately about the handle rotation shaft 3, as shown in FIGS. 7 and 8.

The operating rod 11 connected to the handle levers 6a and 6b are caused to move up and down according to the movement as described above, so that the crank shaft 5 for transmitting the rotating force of the handle levers 6a and 6b to the pedal shaft 19 may be rotated around its horizontal ends by and together with the rotating rod 11, as shown in FIG. 8.

Figure 13A:
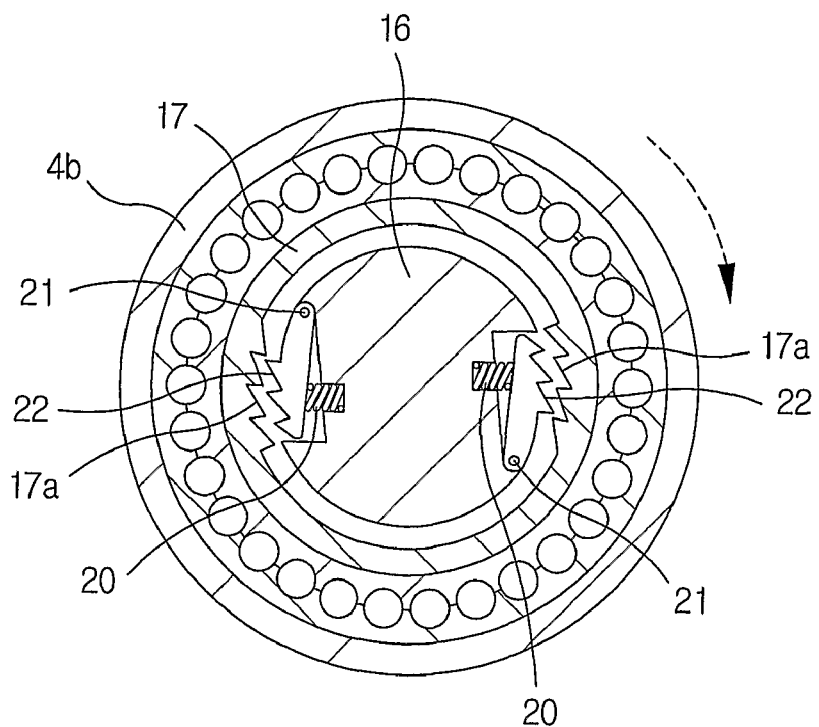
FIG. 13a shows the cross sectional view for illustrating the relation when only the driving gear is rotated without the engagement of the driving gear with the rotating shaft, in the connective relation between the rotating shaft and the driving gear, as shown in FIG. 12.
Figure 13B:
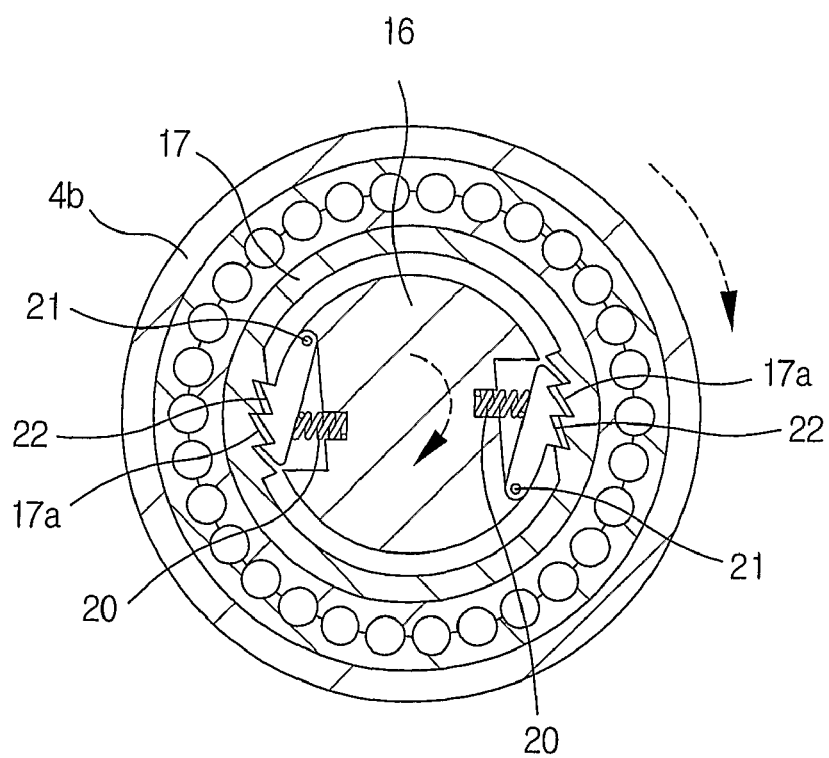
FIG. 13b shows the cross sectional view for illustrating the relation when the driving gear and the rotating shaft are rotated together in the mutual engagement, as compared to FIG. 13a, FIG. 14 shows the perspective front view of the arm and leg powered bicycle according to the second embodiment of the invention.
Figure 14:
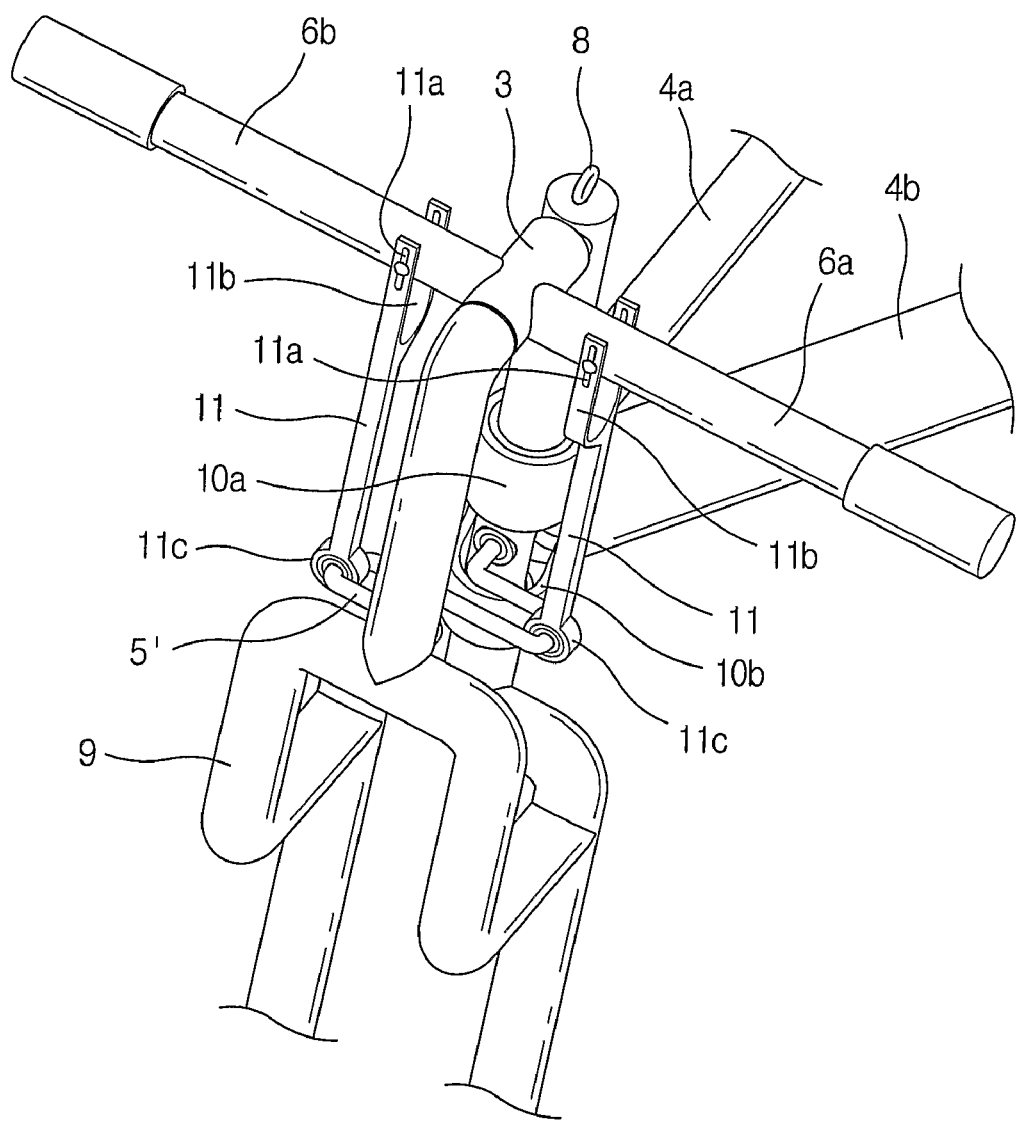

Thus, the rotation of the crank shaft 5 is transferred to the rotation shaft 16 through the flexible joint 15 connected to the crank shaft 5, so that the rotation of the rotation shaft 16 causes, as concretely shown in FIG. 13b, the rocking members 21 located at the bottom of the shaft 16 to advance elastically toward the driving gear 17 on the base of the supporting point 21a under the urging force of the springs 20, to thereby engage the toothed parts 22 with the toothed parts 17a of the driving gear 17, resulting in the rotation of the latter, whereby the driven gear 18 which is in engagement with the driving gear 17 and is fastened around the pedal shaft 19 is caused to rotate in order finally to hand over the torque of the handle levers 6a and 6b to the pedal shaft 19.

On the other hand, when the handle rotation shaft 3 is restrained by the actuating pin 8, the operating means A for the vertical turning of the handle levers 6a and 6b remains inactivated, as shown in FIG. 13a. In this case, when the pedals 12 are rotated only by the feet, the driven gear 18 and the driving gear 17 connected to the driven gear can be rotated, while the toothed parts 17a of the driving gear 17 are little affected by the toothed parts 22 of the rocking members 21 during this rotation due to the elastic property of the rocking members 21 fixed to the immobile rotation shaft 16.

Thus, the inventive arm and leg powered bicycle having the above-described construction may be operated in such a manner that the left pedal 12a is lowered for the half cycle of one turn of raising the left handle lever 6a and the right pedal 12b is lowered for the subsequent half cycle of raising the right handle lever 6b, wherein the leg power may simultaneously be added while the corresponding pedal is forwardly lowered.

Accordingly, the arm and leg powered bicycle according to the invention can be used so that the laborious raising or lowering of the handle levers 6a and 6b may cooperate synchronously with the pressing-down movement of the leg pedals 12a and 12b, while maintaining the balance of the bicycle body. As is evident, the inventive bicycle is characterized in that the power of the arms can take part equally in driving the bicycle as compared to the conventional bicycle depending exclusively on the power of the legs.

Now referring to FIGS. 14 to 18, the arm and leg powered bicycle shown therein have the same construction as that shown in FIGS. 1 to 13, except that the operating rods 11, in the operating means A for turning the handle levers 6a and 6b, are disposed at the two positions, that is, on the left and right sides of the handle levers 6a and 6b, wherein the crank shaft 5' rotating synchronously with the operating rods 11 is shaped in the form of doubled U or ⊐⊏ to suit the movement of the rods 11.

Figure 15:
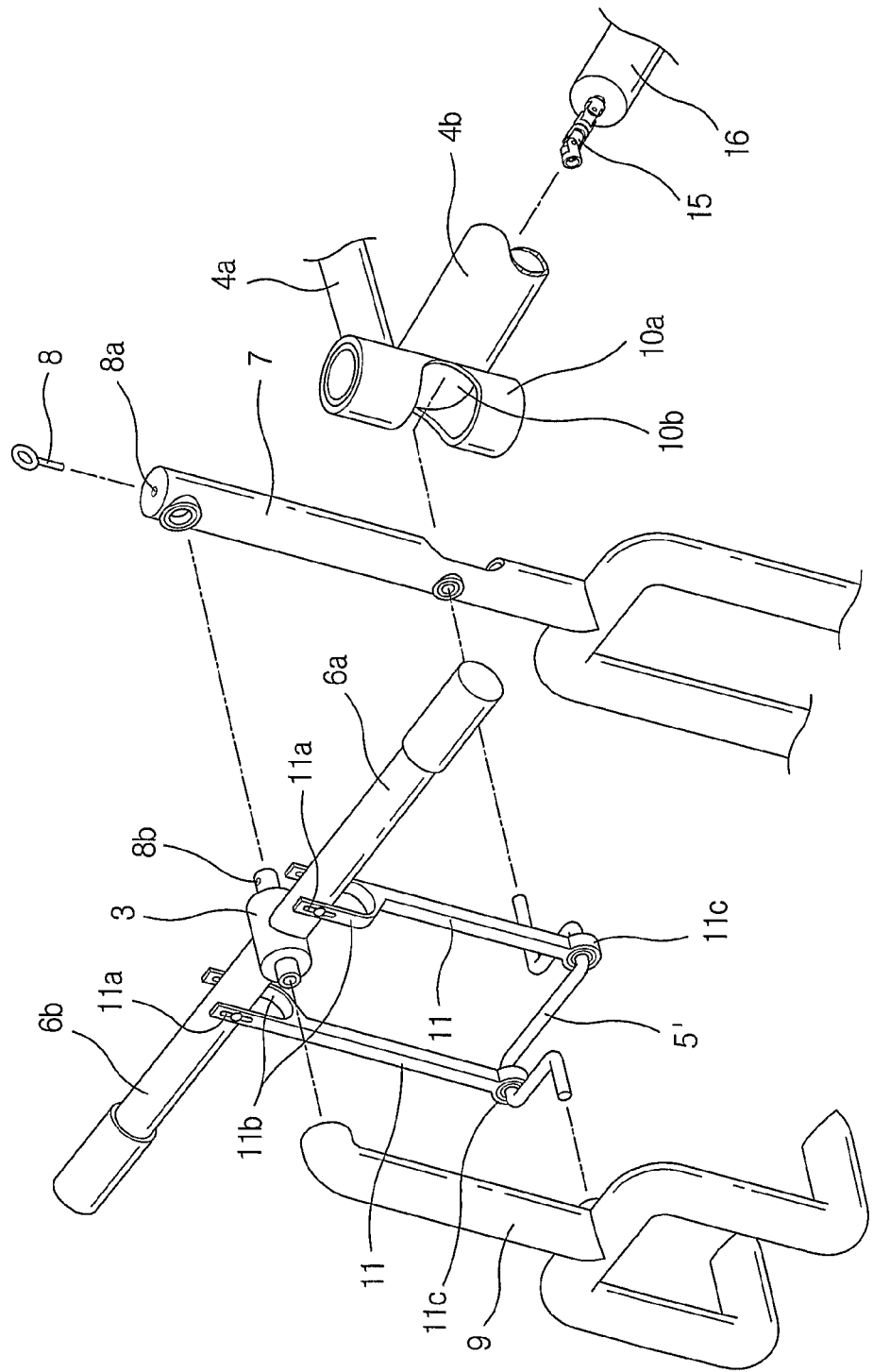
FIG. 15 shows the exploded perspective view to manifest the structure as seen in FIG. 14.
Figure 16:
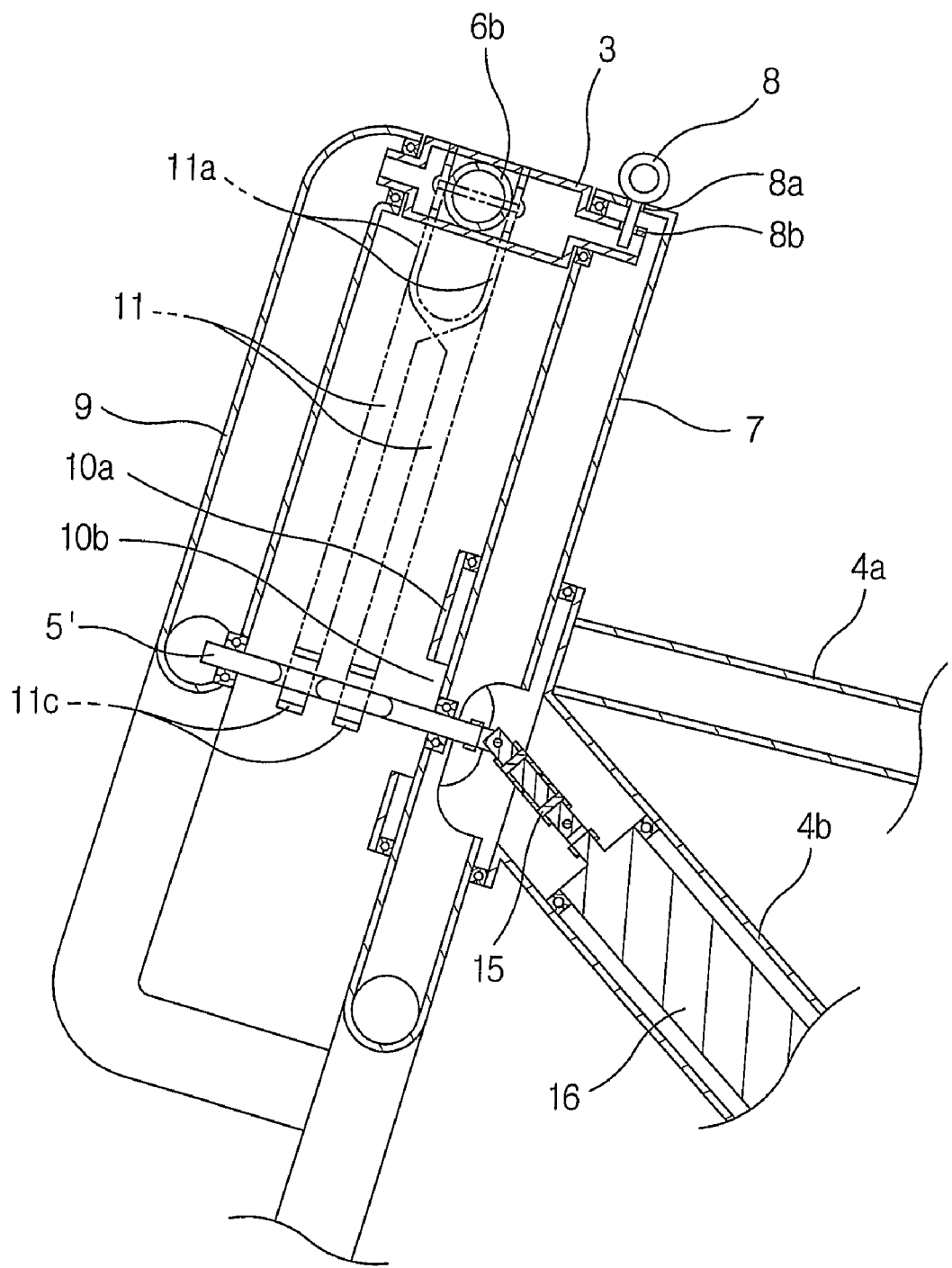
FIG. 16 shows the cross sectional view corresponding to FIG. 14.
Figure 17:
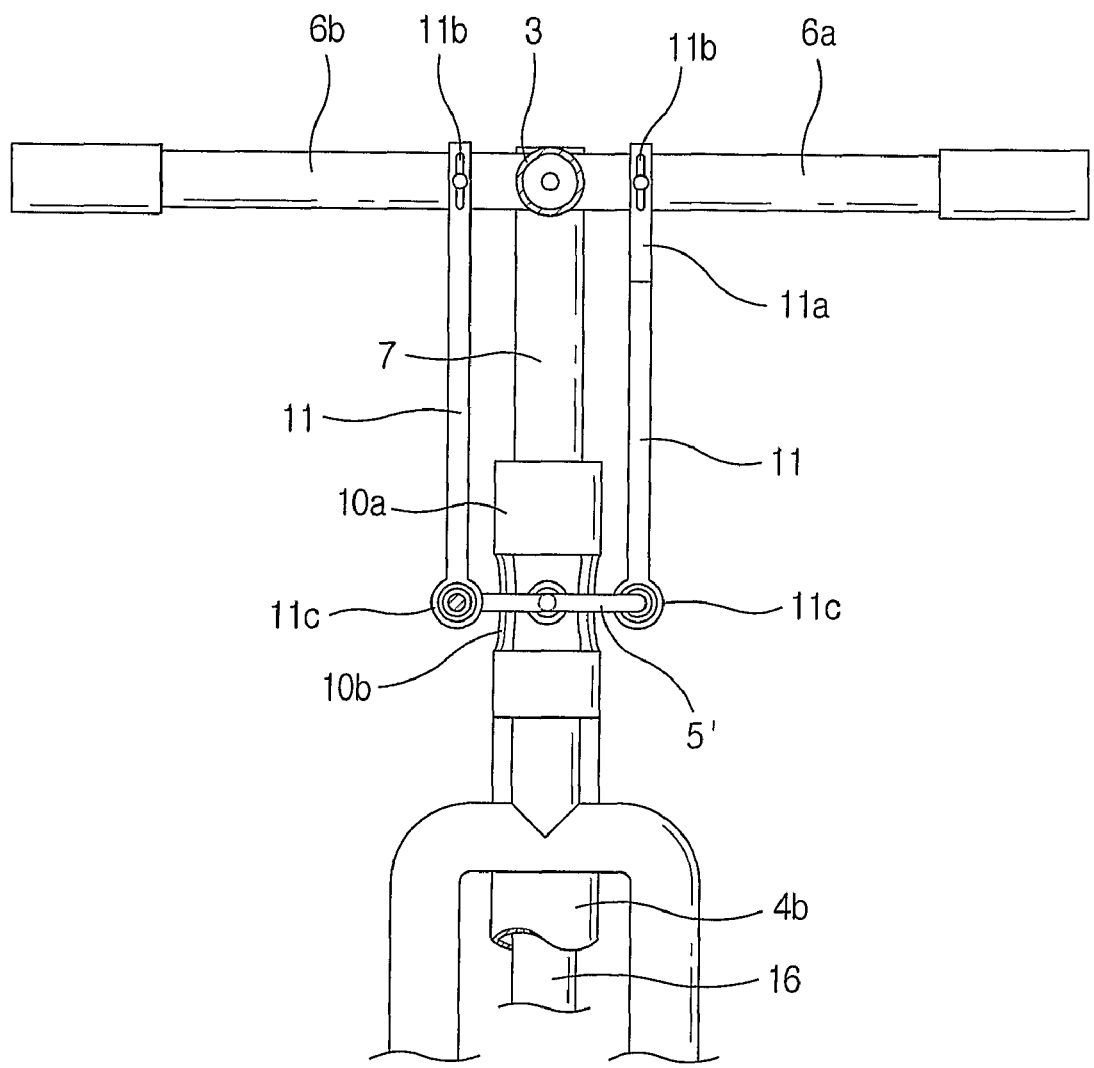
FIG. 17 shows the front view of the arm and leg powered bicycle according to the second embodiment of the invention, corresponding to FIG. 14, showing the horizontal features, with the handle levers remaining in the inactive state.
Figure 18:
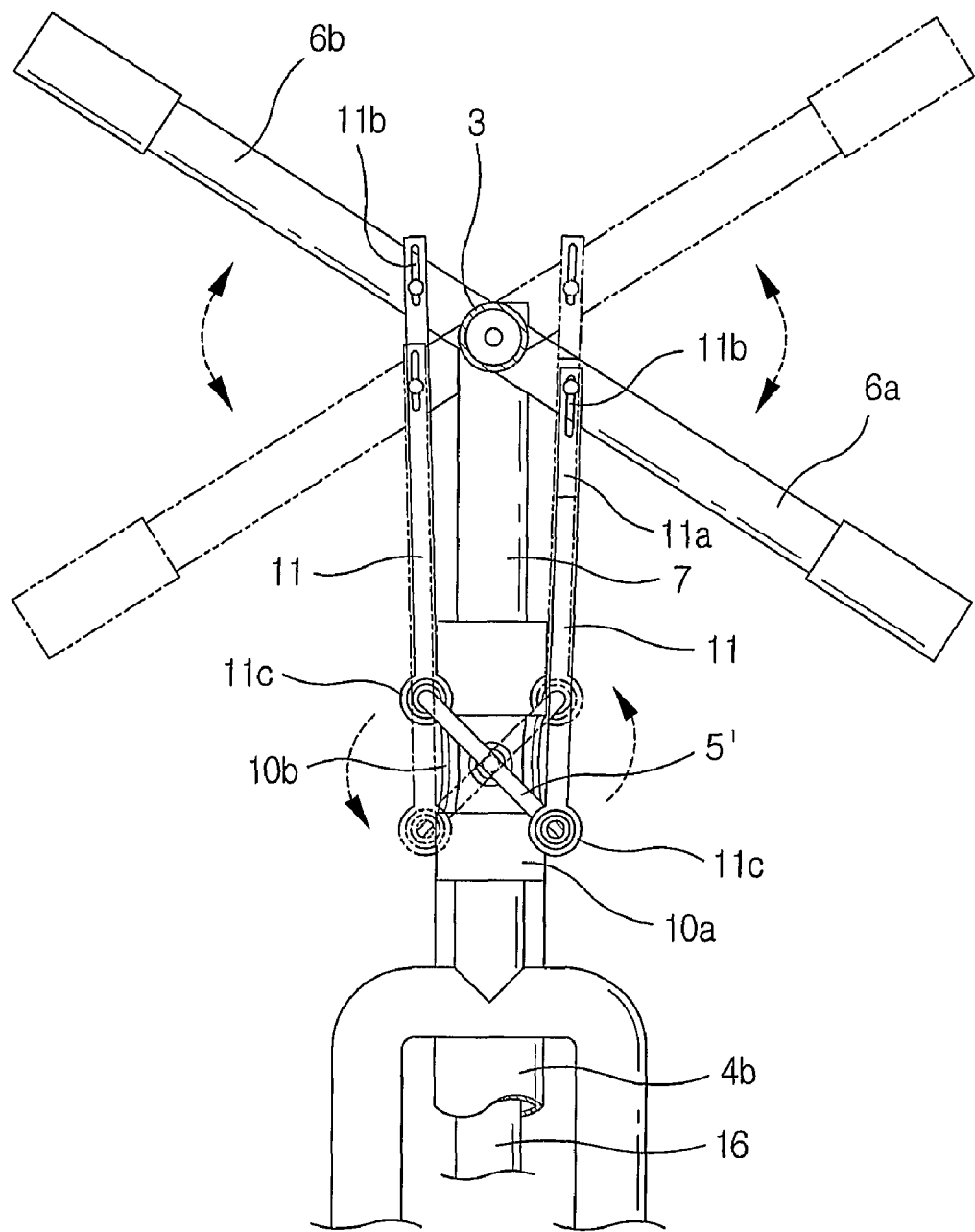
FIG. 18 shows the front view, illustrating the operative state when the handle levers move up and down, deviant from FIG. 17.
Figure 19:
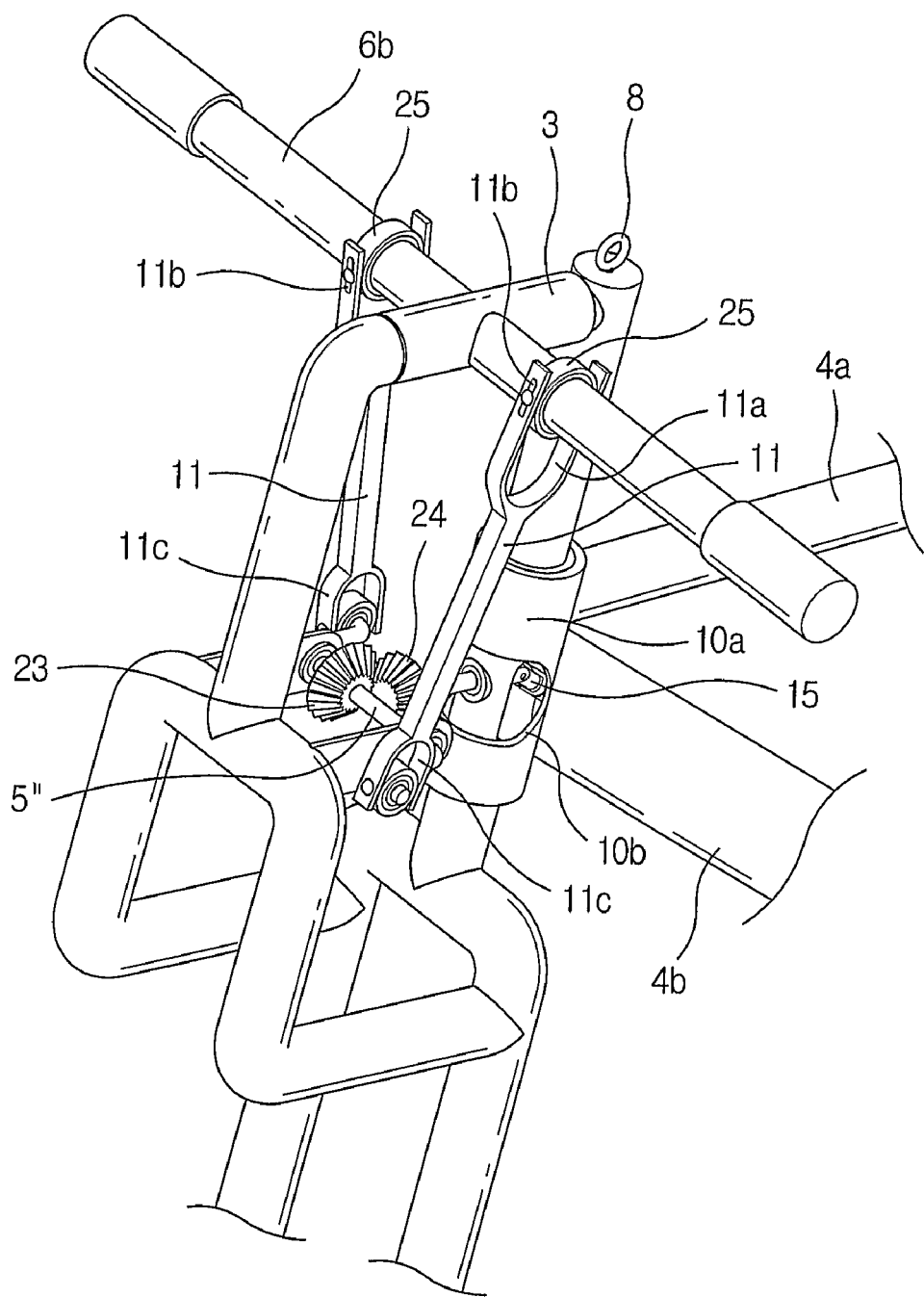
FIG. 19 shows the front perspective view of the arm and leg powered bicycle according to the third embodiment of the invention.
Figure 20:
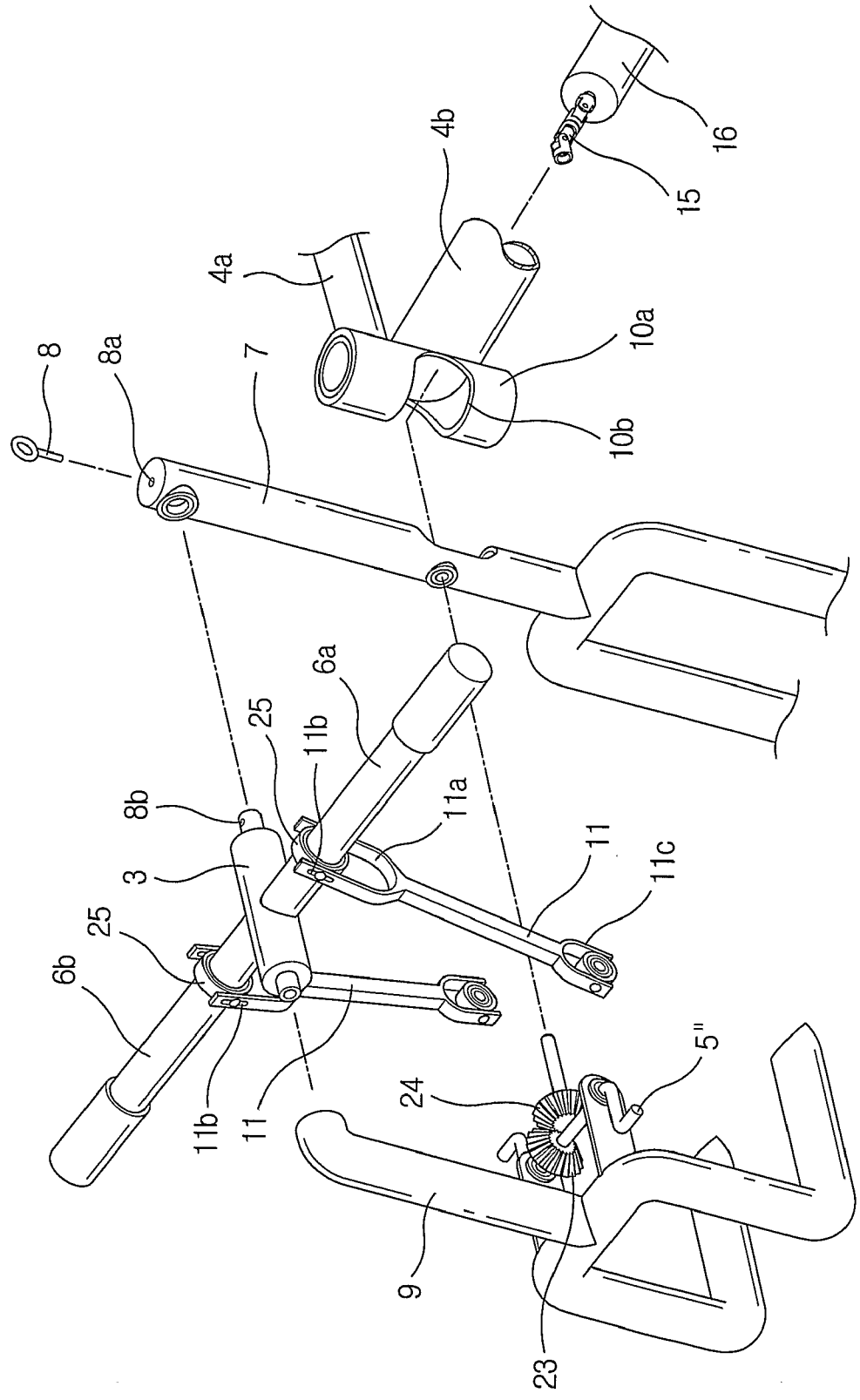
FIG. 20 shows the exploded perspective view regarding FIG. 19.
Figure 21:
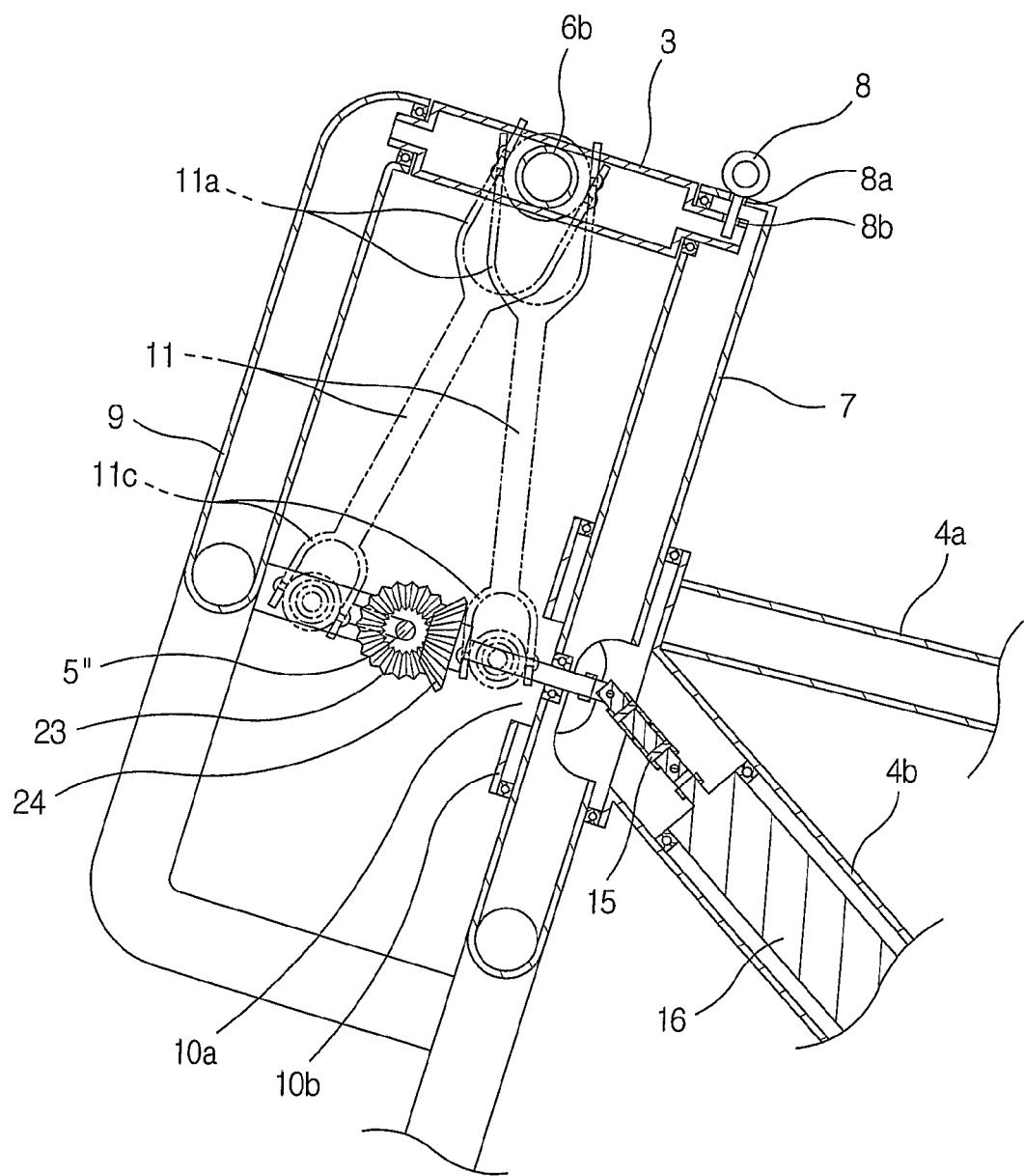
FIG. 21 shows the cross sectional view regarding FIG. 19.
Figure 22:
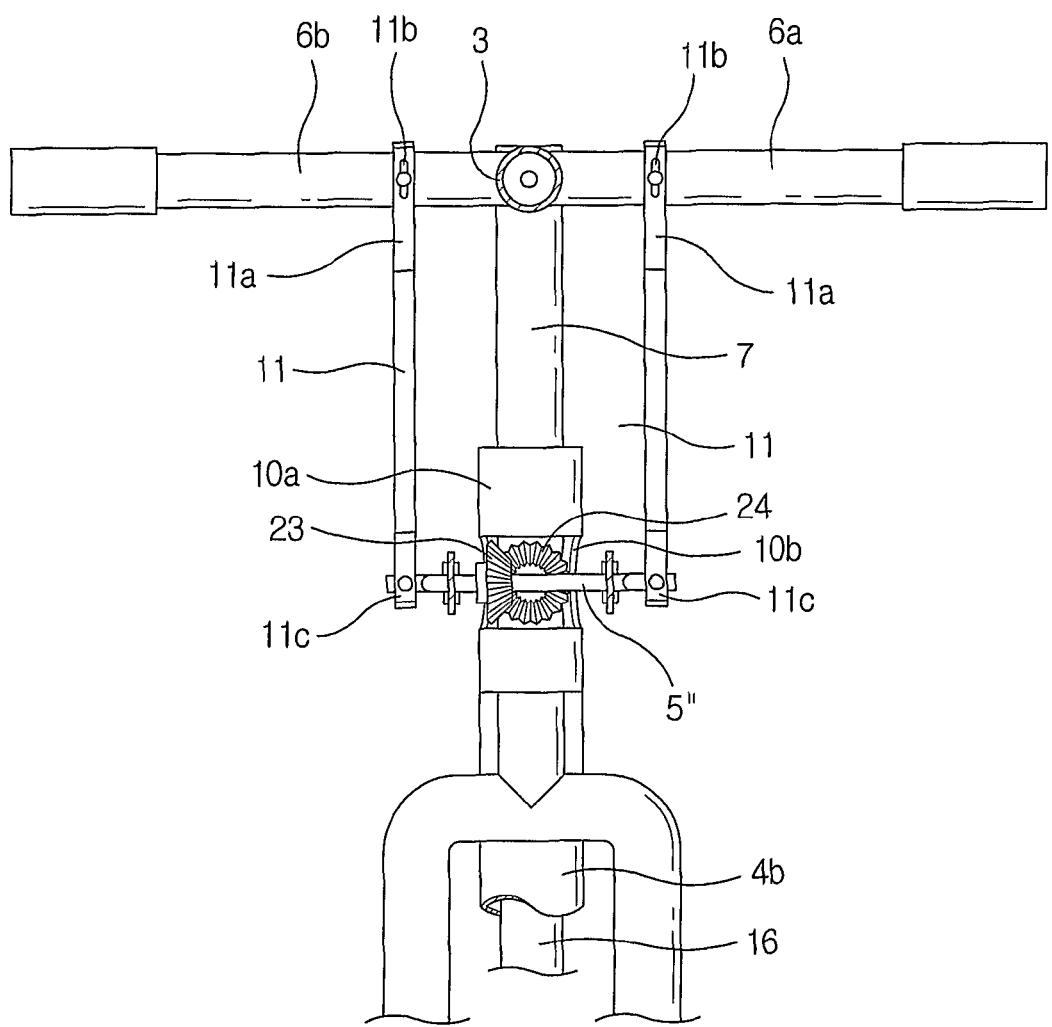
FIG. 22 shows the front view regarding FIG. 19, when the handle levers pose horizontal in the inactive state
Figure 23:
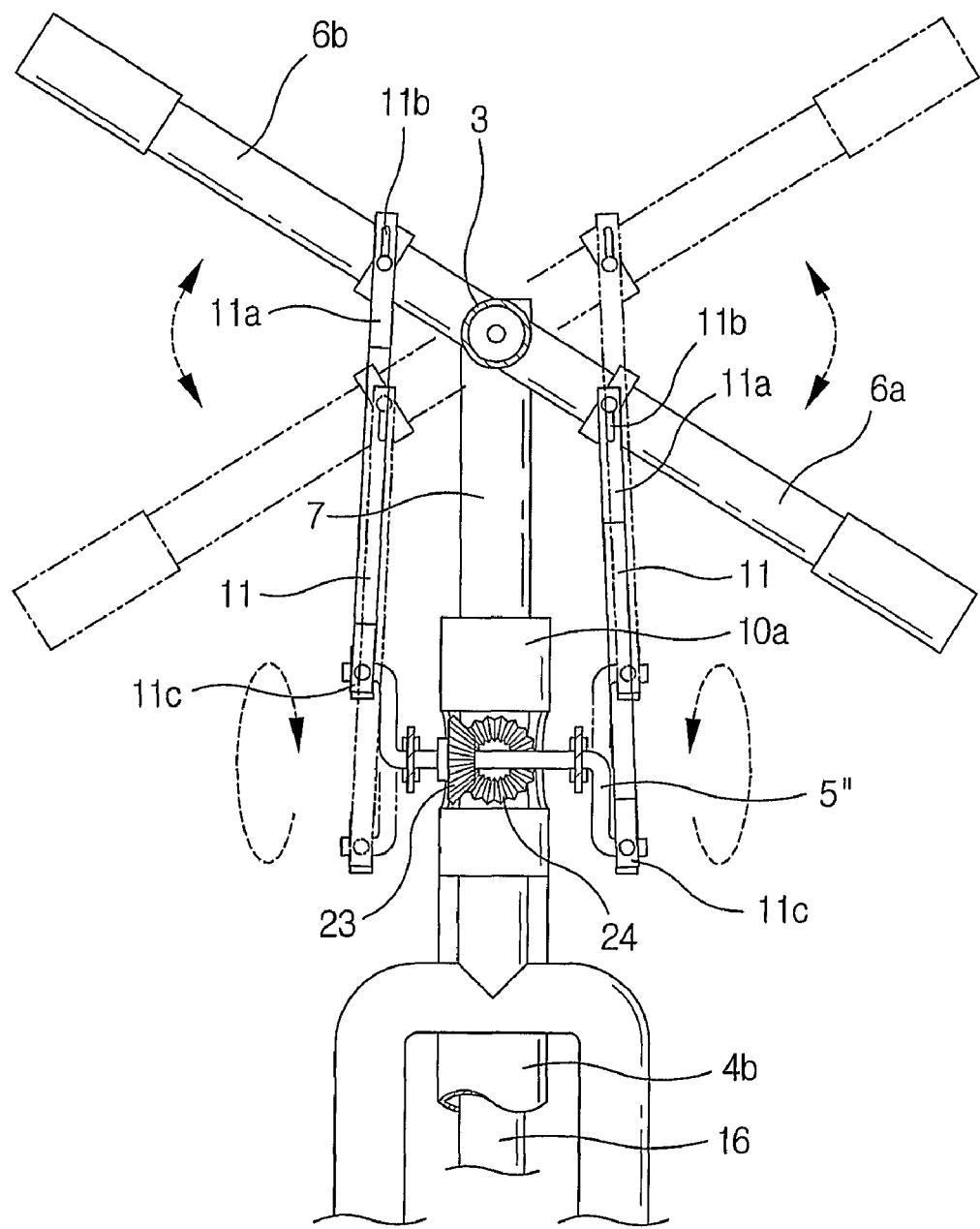
FIG. 23 shows the perspective view regarding FIG. 19, for illustrating the state in operation when the handle levers are moved up and down in the operating state.

Particularly, as seen in the exploded perspective view of FIG. 15 and the cross sectional view of FIG. 16, the two rods 11 are respectively connected to the protrudent portions of the ⊐⊏shaped crank shaft 5'. When the handle levers 6a and 6b are caused to move up and down after removing the actuating pin 8 in the inactive state as shown in FIG. 17, the operations take place in the same way as in the foregoing first embodiment, as can be seen in FIG. 18.

Furthermore, in the arm and leg powered bicycle as shown in FIGS. 19 to 23 representing the variant embodiment of the invention, the crank shaft 5", on which a crank shaft gear 23 and a rotation shaft gear 24 as a bevel gears are mounted, are installed.

As one operating rod 11 and the other operating rod 11 are successively lowered and raised alternately, the crank gear 23 is rotated in one direction to cause the gear 24 in engagement with this crank gear to rotate in one constant direction, resulting in the rotation of the rotation shaft 16 through the flexible joint 15 connected to the gear 24. Hereupon, the top parts 11a of the operating rods 11 are constructed so as to move up and down more smoothly with the help of ring members 25 disposed on the handle levers 6a and 6b, as can be appreciated from FIGS. 19 and 21, whereas the bottom parts 11c are connected to the opposite ends of the crank shaft 5" having the gear 23. The succeeding steps of operation are the same as in the foregoing embodiments.

The arm and leg powered bicycle according to the invention, constructed as described above, are advantageous in that the handle levers are moved up and down by the motion of the arms to transfer the rotating power to the pedal shafts to thereby increase the stepping power by the feet for attaining the doubled running speed of the bicycle and the exercise for the both arms can be conducted simultaneously to benefit the health.

In addition, the arm and leg powered bicycle according to the invention has the advantage that the rotating power of the handle levers can assuredly be transferred to the pedal shaft in a simple way, while maintaining the balance of the bicycle body, differently from the conventional front and rear wheel method, and that rotating power produced by the hands cooperates synchronously with the stepping power of the pedals in rotating the pedal shaft for the safe travel of the bicycle.

The invention claimed is:

1. An arm and leg powered bicycle comprising handle levers, a front wheel, a rear wheel, a handle shaft, supporting frames, pedals, a pedal shaft, front and rear sprockets and a chain belt, the improvement comprising:

an operating means for vertically rotating the handle levers and a means for transferring the rotating force of the handle levers to a pedal shaft;

said operating means for vertically rotating the handle levers is composed of a handle rotation shaft provided vertically movably at the central position of the handle levers, one or two operating rods connected to the left side, right side or both sides of the handle levers, said one or two operating rods being operated according to the raising or lowering movement of the handle levers and a handle rotation shaft support;

said handle levers are provided so as to be rotatable around the handle lever rotating shaft as the rotation center, by the operation of an actuating pin, said actuating pin being provided on the top of the handle shaft, said actuating pin being provided to be connected to the handle rotation shaft;

said means for transferring the rotating force of the handle levers to a pedal shaft comprises a crank shaft connected to the operating rod or rods and rotatable by the vertical movement of the operating rod or rods, a rotating shaft inserted in the inner cavity of a lower supporting frame connected to a handle shaft supporting member, said rotating shaft acting to transfer the driving force of the handle levers to the pedal shaft, a flexible joint provided at one end of the rotating shaft, a driving gear provided at the other end of the rotating shaft, and a driven gear mounted on the circumference of the pedal shaft and engaged with the driving gear to transfer the rotation force to the pedal shaft; and accordingly, the handle levers and the pedals are moved oppositely to each other to cause the vertical rotation of the handle levers to cooperate synchronously with the movement of the pedals.

2. The arm and leg powered bicycle according to claim 1, wherein said crank shaft is shaped substantially in the form of U or to cause the smooth operation of the operating rod or rods.

3. The arm and leg powered bicycle according to claim 2, wherein the driving gear is formed, on its inner circumference, with two toothed parts opposite to each other and the bottom end of the rotating shaft is mounted with two rocking members each having a toothed part to engage with the toothed parts, said rocking members being able to elastically advance to or retreat from the driving gear on the base of the supporting point by springs so as to engage with or disengage from the gear.

4. The arm and leg powered bicycle according to claim 1, wherein the crank shaft is formed substantially in the form of a straight line and a crank gear and a rotating shaft gear are provided there to operate in engagement with each other.

5. The arm and leg powered bicycle according to claim 4, wherein the driving gear is formed, on its inner circumference, with two toothed parts opposite to each other and the bottom end of the rotating shaft is mounted with two rocking members each having a toothed part to engage with the toothed parts, said rocking members being able to elastically advance to or retreat from the driving gear on the base of the supporting point by springs so as to engage with or disengage from the gear.

6. The arm and leg powered bicycle according to claim 1, wherein the driving gear is formed, on its inner circumference, with two toothed parts opposite to each other and the bottom end of the rotating shaft is mounted with two rocking members each having a toothed part to engage with the toothed parts, said rocking members being able to elastically advance to or retreat from the driving gear on the base of the supporting point by springs so as to engage with or disengage from the gear.

7. An arm and leg powered bicycle comprising:
a frame;
a front fork rotationally coupled to the frame about a first axis;
a pedal shaft rotationally coupled to the frame a spaced distance from the front fork;
handle levers coupled to the front fork in a manner that provides: 1) rotation of the front forks about the first axis; and 2) selective rotation of the handle levers about a second axis transverse to the first axis;
a transmission connecting the handle levers to the pedal shaft, the transmission converting the movement of the handle levers about the second axis into rotation of the pedal shaft; wherein the transmission includes:
a crank shaft coupled to the handle levers in a manner that the movement of the handle levers rotates the crank shaft;
a drive shaft rotatably supported by the frame, one end of the drive shaft drivingly coupled to the pedal shaft and the other end drivenly coupled to the crank shaft; and
at least one rigid connecting rod interposed between the handle levers and the crank shaft for imparting movement from the handle levers to the crank shaft.

8. An arm and leg powered bicycle comprising:
a frame;
a front fork rotationally coupled to the frame about a first axis;
a pedal shaft rotationally coupled to the frame a spaced distance from the front fork;
handle levers coupled to the front fork in a manner that provides: 1) rotation of the front forks about the first axis; and 2) selective rotation of the handle levers about a second axis transverse to the first axis;
a transmission connecting the handle levers to the pedal shaft, the transmission converting the movement of the handle levers about the second axis into rotation of the pedal shaft, wherein the transmission includes:
a drive shaft rotatably supported by and disposed within the frame; and
a coupling interconnecting the drive shaft and the pedal shaft.

9. The arm and leg powered bicycle of claim 8, wherein the transmission further includes:
a first gear coupled to the handle levers in a manner that the movement of the handle levers rotates the first gear, the first gear drivingly coupled to the drive shaft.

10. The arm and leg powered bicycle of claim 9, wherein the transmission further includes a second gear connected for co-rotation with the drive shaft and meshingly engaged with the first gear.

11. The arm and leg powered bicycle of claim 9, wherein the transmission further includes at least one rigid connecting rod interposed between the handle levers and the first gear for imparting movement from the handle levers to the first gear.

12. The arm and leg powered bicycle of claim 8, wherein the transmission further includes:
a crank shaft coupled to the handle levers in a manner that the movement of the handle levers rotates the crank shaft, the crank shaft drivingly coupled to the drive shaft.

13. The arm and leg powered bicycle of claim 8, wherein the transmission selectively connects the handle levers to the pedal shaft.

14. The arm and leg powered bicycle of claim 8, wherein the drive shaft is rigid.

* * * * *